(12) United States Patent
Embar Raghukrishnan et al.

(10) Patent No.: US 11,924,435 B2
(45) Date of Patent: Mar. 5, 2024

(54) HIGH QUALITY ADVANCED NEIGHBOR MANAGEMENT ENCODER ARCHITECTURE

(71) Applicant: INTEL CORPORATION, Santa Clara, CA (US)

(72) Inventors: Srinivasan Embar Raghukrishnan, Folsom, CA (US); Jason Tanner, Folsom, CA (US); Naiqian Lu, Fremont, OR (US)

(73) Assignee: Intel Corporation, Santa Clara, CA (US)

( * ) Notice: Subject to any disclaimer, the term of this patent is extended or adjusted under 35 U.S.C. 154(b) by 702 days.

(21) Appl. No.: 16/875,756

(22) Filed: May 15, 2020

(65) Prior Publication Data

US 2020/0280722 A1 Sep. 3, 2020

(51) Int. Cl.
| | |
|---|---|
| *H04N 19/139* | (2014.01) |
| *H04N 19/103* | (2014.01) |
| *H04N 19/119* | (2014.01) |
| *H04N 19/184* | (2014.01) |
| *H04N 19/436* | (2014.01) |

(52) U.S. Cl.
CPC ......... *H04N 19/139* (2014.11); *H04N 19/103* (2014.11); *H04N 19/119* (2014.11); *H04N 19/184* (2014.11); *H04N 19/436* (2014.11)

(58) Field of Classification Search
CPC .. H04N 19/436; H04N 19/139; H04N 19/103; H04N 19/119; H04N 19/52; H04N 19/51
See application file for complete search history.

(56) References Cited

U.S. PATENT DOCUMENTS

| | | |
|---|---|---|
| 2013/0182774 A1 | 7/2013 | Wang et al. |
| 2017/0310983 A1* | 10/2017 | Gudumasu .......... H04N 19/127 |
| 2017/0324973 A1 | 11/2017 | Tanner et al. |
| 2022/0116600 A1* | 4/2022 | Rosewarne .......... H04N 19/176 |

OTHER PUBLICATIONS

Extended European Search Report for European Patent Application No. 20216348.1, dated Jun. 4, 2021.
Zhao, J. et al., "Parallel prediction unit for parallel intra coding", Joint Collaborative Team on Video Coding (JCT-VC) of ITU-T SG16 WP3 and ISO/IEC JTC1/SC29/WG11, 2nd meeting: Geneva, CH, Jul. 21-28, 2010.
Zhou, M., "Parallelized merge/skip mode for HEVC", Joint Collaborative Team on Video Coding (JCT-VC) of ITU-T SG16 WP3 and ISO/IEC JTC1/SC29/WG11, 6th Meeting: Torino, Italy Jul. 14-22, 2011.

* cited by examiner

*Primary Examiner* — Boubacar Abdou Tchoussou
(74) *Attorney, Agent, or Firm* — Essential Patents Group, LLP

(57) ABSTRACT

Techniques related to parallel partitioning and coding mode selection for improved video coding throughput are discussed. Such techniques include performing parallel partitioning and coding mode selection for a lower-right coding unit of a first largest coding unit and an upper-left coding unit of a second largest coding unit to the right of the first largest coding unit and, immediately subsequent thereto, performing parallel partitioning and coding mode selection for a lower-left coding unit and an upper-right coding unit of the second largest coding unit.

20 Claims, 11 Drawing Sheets

|   |   |   |   |   |   |   |   |   |   |   |
|---|---|---|---|---|---|---|---|---|---|---|
| 0 | 1 | 2 | 3 | 4 | 5 | 6 | 7 | 8 | 9 | 10 |
| 2 | 3 | 4 | 5 | 6 | 7 | 8 | 9 | 10 | 0 | 1 |
| 4 | 5 | 6 | 7 | 8 | 9 | 10 | 0 | 1 | 2 | 3 |
| 6 | 7 | 8 | 9 | 10 | 0 | 1 | 2 | 3 | 4 | 5 |
| 8 | 9 | 10 | 0 | 1 | 2 | 3 | 4 | 5 | 6 | 7 |
| 10 | 0 | 1 | 2 | 3 | 4 | 5 | 6 | 7 | 8 | 9 |
| 1 | 2 | 3 | 4 | 5 | 6 | 7 | 8 | 9 | 10 | 11 |

FIG. 8

HIGH QUALITY ADVANCED NEIGHBOR MANAGEMENT ENCODER ARCHITECTURE

BACKGROUND

In video compression/decompression (codec) systems, compression efficiency, video quality, and processing efficiency are important performance criteria. For example, visual quality is an important aspect of the user experience in many video applications and compression efficiency impacts the amount of memory storage needed to store video files and/or the amount of bandwidth needed to transmit and/or stream video content. Furthermore, processing efficiency, including processing speed and use of limited computational resources, is an important aspect of encode as there is a continuing desire to encode more quickly and with less power. For example, a video encoder compresses video information so that more information can be sent over a given bandwidth or stored in a given memory space or the like. The compressed signal or data is then decoded by a decoder that decodes or decompresses the signal or data for display to a user. In most implementations, higher visual quality with greater compression and high processing efficiency is desirable.

In some contexts, media encode workloads have scalability limitations due to tightly coupled neighbor dependencies while product implementation capabilities require real time performance such as ultra high definition encode at 60 frames per second at very high encode quality. Typically, brute force neighbor dependency management such as wavefront splits as well as less stringent quality requirements are used to achieve scalability. However, such wavefront splits and lower quality both reduce decode video quality to unacceptable levels in some presentation contexts.

There is an ongoing concern with improving encode speed and efficiency while maintaining subjective video quality. It is with respect to these and other considerations that the present improvements have been needed. Such improvements may become critical as the desire to compress and transmit video data becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 6 illustrates an example raster scan order for processing largest coding units of a video frame;

FIG. 7 illustrates an example wavefront scan order for processing largest coding units of a video frame;

FIG. 8 illustrates an example wavefront scan order with a wavefront split boundary for processing largest coding units of video frame;

DETAILED DESCRIPTION

Figure 1:
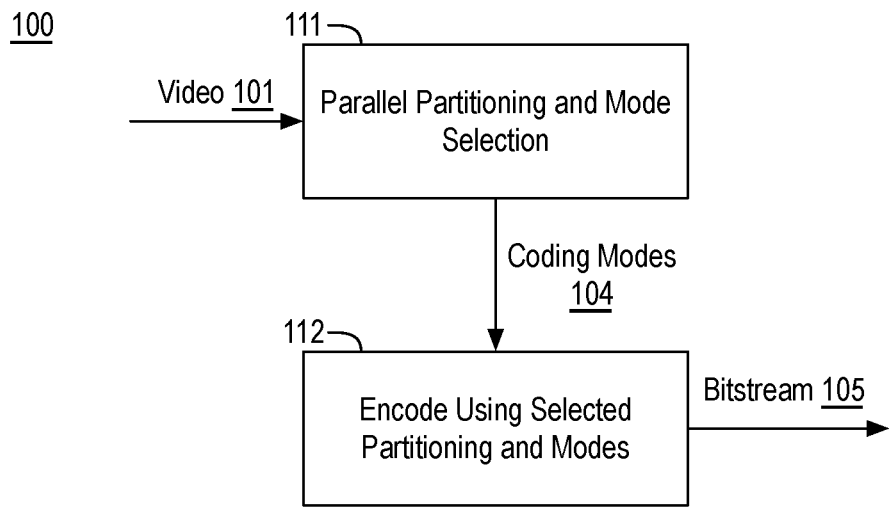
FIG. 1 is an illustrative diagram of an example system for coding video to generate a bitstream.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

Methods, devices, apparatuses, computing platforms, and articles are described herein related to parallel video coding and, in particular, to neighbor dependency management for improved encode performance with minimal visual artifacts.

As described above, it may be advantageous to improve coding performance by performing at least some video coding operations in parallel. In particular, a video frame may be divided into blocks or largest coding units (LCUs) or coding tree units (CTU) or the like. As used herein, the term largest coding unit or block indicates any pixel region of a video frame such as a 64×64 pixel region. Each LCU or block may be further partitioned into coding units (CUs) or sub-blocks and further into prediction units (PUs) or prediction blocks, and transform units (TUs) or transform blocks. Notably, the partitioning and coding mode decisions for an LCU or CU dictate, after evaluation a number of available partitionings and potential coding modes (e.g., intra and inter), the partitioning and coding mode to be applied during encode. As used herein, the term performing partitioning and coding mode decisions or selections and similar terms indicate a partitioning for the LCU or CU and a coding mode for each partition are determined. The terms partitioning and coding modes decisions and partitioning and coding modes selections are used interchangeably herein. Such performing partitioning and coding mode decisions may be indicated using any suitable data structures and syntaxes such as partition split flags, coding mode indicators or flags, etc. Notably, such processing does not include actual encode into a bitstream. Such partitioning and coding mode decisions are subsequently employed in a packetization stage to encode the video frame. That is, the partitioning and coding mode decisions are used without modification for bitstream formation after the decision making portion of the encode.

In some embodiments, coding unit partitioning and coding mode decisions are parallelized for improved computation performance while minimizing visual artifacts due to the broken dependencies that allow the parallelization. The techniques discussed herein support a two stage pipeline (e.g., with a reduced number of stages with respect to prior pipeline architectures), which can provide a 3× performance improvement (e.g., throughput) while resulting in less than a 2% quality impact. In some embodiments, partitioning and coding mode decisions for a lower-right coding unit (e.g., 32×32 pixels) of a first largest coding unit (e.g., 64×64 pixels) and an upper-left coding unit (e.g., 32×32 pixels) of a second largest coding unit (e.g., 64×64 pixels) immediately to the right of the first largest coding unit are performed in parallel. As used herein, the terms performed in parallel, processed in parallel, parallel processing and similar terms indicate the two or more processes overlap at least partially temporally. For example, a first temporal window defined by a start and end time of a first process (e.g., partitioning and coding mode decisions for a first coding unit) at least partially overlaps with a second temporal window defined by a start and end time of a second process (e.g., partitioning and coding mode decisions for a second coding unit). In some embodiments, the start times of parallel processes begin substantially simultaneously. However, any parallel processing context may be employed.

Notably, such parallel coding unit partitioning and coding mode decisions cross a boundary between the first and second largest coding units. Furthermore, such parallel coding requires the breaking of some dependencies between largest coding units that may negatively effect quality in some contexts. Such dependency breaking is discussed further herein below. In some embodiments, immediately subsequent to the discussed parallel partitioning and coding mode decisions for the a lower-right coding unit of the first largest coding unit and the upper-left coding unit of the second largest coding unit, parallel coding unit partitioning and coding mode decisions or selections are made for the upper-right coding unit and the lower-left coding unit of the second largest coding unit. As used herein, the term immediately subsequent with respect to partitioning and coding mode decisions indicates partitioning and coding mode decisions are not made for any intervening coding units and does not necessarily indicate the partitioning and coding mode decisions follow within any particular time interval or number of clock cycles, although more immediate subsequent processing is desirable. Again, such parallel coding unit breaks dependencies between the parallel partitioning and coding mode decisions. Furthermore, such partitioning and coding mode decisions or selections may be performed in a single group of operations or such partitioning and coding mode decisions or selections may be performed by first performing integer motion estimation (IME) for the coding units in parallel and subsequently using the results from the IME in parallel final partitioning and coding mode decisions or selections for the coding units.

Such processing continues from largest coding unit to largest coding unit in any scan order (e.g., raster scan order, wavefront scan order, wavefront scan order with wavefront split, etc.) in a video frame to perform partitioning and coding mode decisions for each largest coding unit. Such partitioning and coding mode decisions, as discussed, are then used to code all largest coding units into a bitstream. The techniques discussed herein, instead of breaking dependencies only across largest coding units (e.g., brute-force using wavefront splits), reduce the number of dependent stages within the processing of each largest coding unit to two stages by pipelining and adjusting block dependencies to attain higher performance while reducing quality impacts. The techniques may be employed in any parallel processing compute environment such as via employment of multi-core central processing units (CPUs), multi-core graphics processing units (GPUs), multi-core GPU accelerators, etc.

FIG. 1 is an illustrative diagram of an example system 100 for coding video 101 to generate a bitstream 105, arranged in accordance with at least some implementations of the present disclosure. As shown in FIG. 1, system 100 includes a parallel partitioning and mode selection module 111 and an encode module 112 (labeled encode using selected partitioning and modes to indicate encode module 112 does not perform partition or mode selection). Each of parallel partitioning and mode selection module 111 and encode module 112 are illustrated separately for the sake of clarity. However, such modules may be implemented in the same or different encode software, hardware, firmware, etc. Notably, parallel partitioning and mode selection module 111 may be implemented by a parallel multi-core processor or other parallel processing environment with coding modes being selected for blocks in parallel as discussed further herein while encode module 112 may be implemented by a single core or multi-core processor with block encode (using the selected modes) being performed serially. For example, system 100 may implement a multi-phase encode with a partitioning and mode selection phase (implemented by parallel partitioning and mode selection module 111) and an encode phase (implemented by encode module 112).

System 100 provides video compression and system 100 may be a portion of a video encode system implemented via a computer or computing device such as a computing system or the like. For example, system 100 receives video 101 (e.g., video data) and generates bitstream 105, which may be decoded by a decoder to generate a decompressed version of video 101. Bitstream 105 may be compatible with a video compression-decompression (codec) standard such as, for example, HEVC (High Efficiency Video Coding), AVC (Advanced Video Coding/H.264/MPEG-4 Part 10), VVC (Versatile Video Coding/MPEG-I Part 3), VP8, VP9, Alliance for Open Media (AOMedia) Video 1 (AV1), the VP8NP9/AV1 family of codecs, etc. System 100 may be implemented via any suitable device such as, for example, server, a personal computer, a laptop computer, a tablet, a phablet, a smart phone, a digital camera, a gaming console, a wearable device, a display device, an all-in-one device, a two-in-one device, or the like. For example, as used herein, a system, device, computer, or computing device may include any such device or platform.

System 100 may include other modules or sub-modules not shown for the sake of clarity of presentation. For example, system 100 may include a downsampler and an encode controller, a transform module, a quantization module, an intra prediction module, an inter prediction module, a reference picture buffer, a scanning module, an entropy encoder, etc., which may be implemented via parallel partitioning and mode selection module 111 and/or encode module 112. Such modules are known to those of skill in the art and are not discussed further herein for the sake of clarity of presentation.

As shown, system 100 receives video 101. Video 101 may include any video sequence for encode. Such video may include any suitable video frames, video pictures, sequence of video frames, group of pictures, groups of pictures, video data, or the like in any suitable resolution. For example, the video may be video graphics array (VGA), high definition (HD), Full-HD (e.g., 1080p), 4K resolution video, 8K resolution video, or the like, and the video may include any number of video frames, sequences of video frames, pictures, groups of pictures, or the like. Techniques discussed herein are discussed with respect to frames, largest coding units, coding units, prediction units, and transform units for the sake of clarity of presentation. However, such frames, largest coding units, coding units, prediction units, and transform units may be characterized as picture, blocks, sub-blocks, prediction blocks, and transform blocks, or the like. As used herein, a largest coding unit and a coding unit may be any size and shape such that each includes a plurality of pixel samples (typically square or rectangular) in any suitable color space such as YUV. Notably, each largest coding unit may be fully partitioned into coding units, each coding unit may be fully partitioned into prediction units, and so on. That is, each partitioning maintains the whole in subunits thereof. Furthermore, coding unit or block may be partitioned into prediction units or sub-blocks, which also may be characterized as blocks depending on context. Also a block, sub-block, or coding unit may be optionally divided into a transform block or transform unit for the purposes of transformation of residuals. As used herein, the term size indicates the size of such coding units, transform units, etc. and does not necessarily include the unit itself. The term coding unit or transform unit may indicate the size thereof. Such frames may be characterized as pictures, video pictures, sequences of pictures, video sequences, etc., such coding units or blocks may be characterized as largest coding units, coding units, coding blocks, macroblocks, sub-units, sub-blocks, etc.

For example, a picture or frame of color video data may include a luminance plane or component and two chrominance planes or components at the same or different resolutions with respect to the luminance plane. The video may include pictures or frames that may be divided into blocks of any size, which contain data corresponding to blocks of pixels. Such blocks may include data from one or more planes or color channels of pixel data. For example, a block may be a coding unit or a partition thereof. In the context of the High Efficiency Video Coding (HEVC), the HEVC standard defines a largest coding unit for a frame that may be partitioned into coding units (CUs) that take the form of rectangular blocks having variable sizes. Such coding units may be used as the basic unit or block for coding. Such coding units may be partitioned into prediction units (PUs) for prediction and/or transform units (TUs) for transform that also take the form of rectangular blocks (typically square) having variable sizes. However, as discussed, the largest coding units and coding units of video data may include any video data and any coding standard may be used.

Bitstream 105 may be any bitstream representative of video 101 such as an HEVC compliant bitstream or a bitstream compliant to any other codec. During encode of frames of video 101, any number of coding modes, coding unit partitions, transform unit partitions, and so on are evaluated to arrive at final coding modes for units or portions of video 101. Such final coding modes for video 101 as well as other coding information are provided in bitstream 105.

Partitioning and coding modes 104 are generated by parallel partitioning and mode selection module 111 using the techniques discussed herein. Notably, parallel partitioning and mode selection module 111 performs partitioning and coding mode selections for coding units in parallel such that the coding units are sub-portions or sub-regions of a largest coding unit, the coding units together make up the entire largest coding unit, and such that the largest coding unit and the coding units may have provided coding modes. Such terms are used herein throughout for the sake of clarity of presentation. However, such largest coding units may be characterized as coding tree units, macroblocks, base blocks, or the like and such coding units may be characterized as coding blocks, prediction units or blocks, sub-blocks, or the like.

As discussed further herein, parallel partitioning and mode selection module 111 performs partitioning and coding mode selections for coding units in parallel. Such partitioning and coding mode selections include selecting, for the largest coding unit, a partitioning of the largest coding unit and/or the coding units (e.g., into smaller coding, prediction, and/or transform units inclusive of providing no partitioning for prediction and/or transform). In some embodiments, the selections may be performed in a single group of operations such that intra and inter modes, partitioning sizes, etc. are evaluated at the coding unit level in parallel. In some embodiments, the selections are broken into an integer motion estimation phase where an integer candidate motion vector is selected for the coding unit and a final selection phase where the integer candidate motion vector is used to evaluate inter and intra modes, partitioning sizes, etc. In some embodiments, the parallel coding unit processing discussed herein includes performing integer motion estimation for the coding units in parallel and, subsequently, performing the final partitioning and coding modes selections for the coding units in parallel with use of the previously determined candidate motion vector. In either case, partitioning and coding modes 104 include the partition selection and coding modes selections needed to code the largest coding unit without further decision making.

As shown, partitioning and coding modes 104 are transferred from parallel partitioning and mode selection module 111 to encode module 112. Partitioning and coding modes 104 include, as discussed, the selected partitioning (including the possibility of no partitioning) and coding mode for encode of each largest coding unit and coding unit (when employed) of a video frame of video 101 as well as any other pertinent information for the encode. For example, a skip mode for a coding unit is accompanied with a motion vector (possibly a zero motion vector) or reference to a merge motion vector such that encode module 112 may then perform encode for the coding unit by attaining a reference coding unit corresponding to the motion vector and using the reference coding unit as the predicted coding unit. Each coding unit may then be coded (via a local decode loop) and other operations as known in the art such as loop filtering techniques are performed to generate a reconstructed frame for the current frame. Such reconstructed frames may be transferred to parallel partitioning and mode selection module 111 for use in coding mode decision selection for subsequent frames, and so on such that parallel partitioning and mode selection module 111 produces coding mode decisions and encode module 112 generates bitstream 105 (for use by a decoder) and reconstructed frames (both for use locally in the encode by encode module 112 and for use by coding mode decisions and encode module 112 in coding mode selection).

Notably, during encode, a video frame of video 101 is divided into spatial coding units or blocks that are predicted from the pixels surrounding the coding unit or block (spatial/intra prediction) or from pixels of a prior or subsequent frame with a similar region to the coding unit or block (temporal/inter prediction). The block or portion may optionally be divided into different size coding units or sub-blocks that have different available modes. The decision between all of these choices makes up the partitioning and coding mode selection, which is then implemented during encode.

Figure 2:
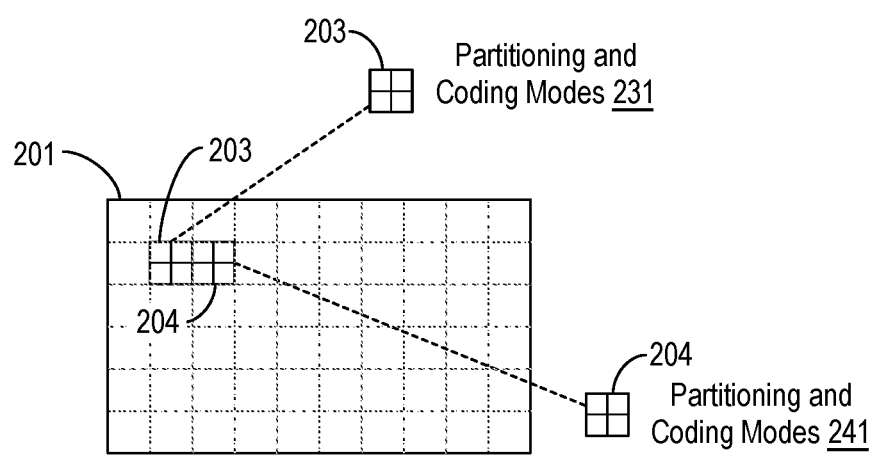
FIG. 2 illustrates an example video frame of video.

FIG. 2 illustrates an example video frame 201 of video 101, arranged in accordance with at least some implementations of the present disclosure. As shown, video frame 201 is segmented into any number of largest coding units or blocks as illustrated with respect to largest coding units 203, 204. Largest coding units 203, 204 are further divided coding units (not labeled in FIG. 2), transform units, etc. during encode. Notably, largest coding units may also be characterized as coding units in some contexts. In some embodiments, video frame 201 is segmented into largest coding units, which are segmented into coding units. However, any picture structure may be used that divides the frame into macroblocks, blocks, units, sub-units, etc. As shown, partitioning and coding mode decisions are made for largest coding unit 203 and largest coding unit 204 using parallel coding unit processing techniques as discussed herein.

For each largest coding unit of video frame 201, partitioning and coding mode(s) are selected as illustrated with respect to partitioning and coding modes 231 as selected for largest coding unit 203 and partitioning and coding modes 241 as selected for largest coding unit 204. Notably, in response to largest coding unit 204 being horizontally aligned with and immediately to the right of largest coding unit 203, partitioning and coding mode selection for the upper-left coding unit of largest coding unit 204 is performed in parallel with partitioning and coding mode selection for the lower-right coding unit of largest coding unit 203. Furthermore, immediately subsequent to such partitioning and coding mode selections, partitioning and coding mode selection for the lower-left coding unit of largest coding unit 204 and the upper-right coding unit of largest coding unit 204 is performed in parallel. Such parallel processing improves performance by breaking dependencies between the coding units at a minimal quality cost.

Returning to FIG. 1, partitioning and coding modes 104 for video frame 201, including partitioning and coding modes 231, partitioning and coding modes 241, and so on are then provided to encode module 112 for use in encode of video frame 201. Notably, encode module 112 does not evaluate encode modes but performs encode using partitioning and coding modes 104 without change.

Figure 3:
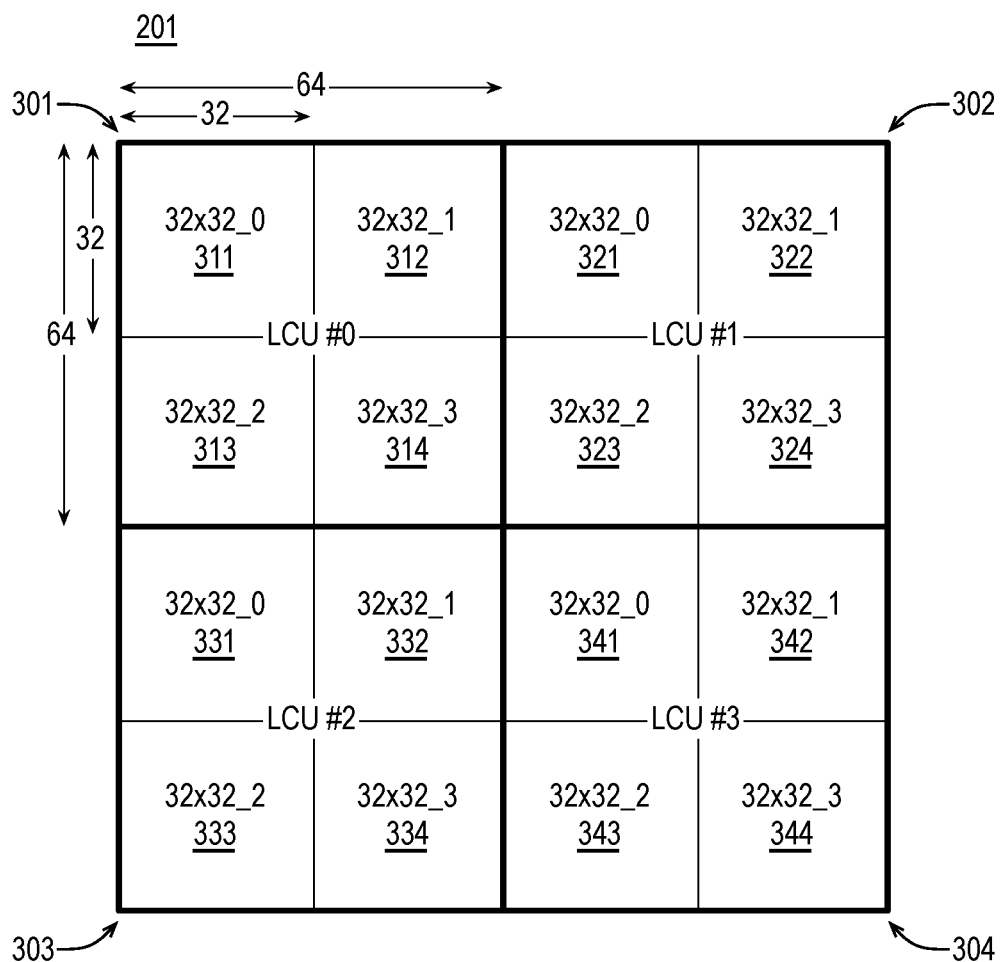
FIG. 3 illustrates example neighboring largest coding units of an example video frame.

FIG. 3 illustrates example neighboring largest coding units 301, 302, 303, 304 of example video frame 201, arranged in accordance with at least some implementations of the present disclosure. In the example of FIG. 3, largest coding unit 301 (LCU #0) may be located at substantially any position within video frame 201. Largest coding unit 302 (LCU #1) is horizontally aligned with and immediately adjacent and to the right of largest coding unit 301. As used herein, the term immediately adjacent, immediately to the right of, and so on within a video frame indicate no pixels are between the units or blocks being referenced. Furthermore, largest coding unit 303 (LCU #2) is vertically aligned with and immediately adjacent and above largest coding unit 301 and largest coding unit 304 (LCU #3) is horizontally aligned with and immediately adjacent and to the right of largest coding unit 303 and vertically aligned with and immediately adjacent and below largest coding unit 302. The pattern of FIG. 3 within video frame 201 repeats with any number of grid aligned largest coding units.

Furthermore, each largest coding unit includes or is partitioned into four coding units such that the sum of the coding units is the whole of each largest coding units. For example, largest coding unit 301 includes upper-left coding unit 311 (32×32_0), upper-right coding unit 312 (32×32_1), lower-left coding unit 313 (32×32 2), and lower-right coding unit 314 (32×32 3), largest coding unit 302 includes upper-left coding unit 321 (32×32_0), upper-right coding unit 322 (32×32_1), lower-left coding unit 323 (32×32_2), and lower-right coding unit 324 (32×32_3), largest coding unit 303 includes upper-left coding unit 331 (32×32_0), upper-right coding unit 332 (32×32_1), lower-left coding unit 333 (32×32 2), and lower-right coding unit 334 (32×32_3), and largest coding unit 304 includes upper-left coding unit 341 (32×32_0), upper-right coding unit 342 (32×32_1), lower-left coding unit 343 (32×32 2), and lower-right coding unit 344 (32×32_3). In the illustrated example, each largest coding unit is 64×64 pixels and each coding unit is 32×32 pixels although any sizes may be employed.

As discussed further herein, largest coding units 301, 302, 303, 304 are processed in a particular order within video frame 201 according to a scan order such as a raster scan order, a wavefront scan order, or a wavefront scan order with wavefront split. The coding unit parallel processing discussed herein may be combined with such raster scan order, a wavefront scan order, or a wavefront scan order with wavefront split. In some embodiments, such combined processing provided increased parallelization as discussed further herein below.

Figure 4:
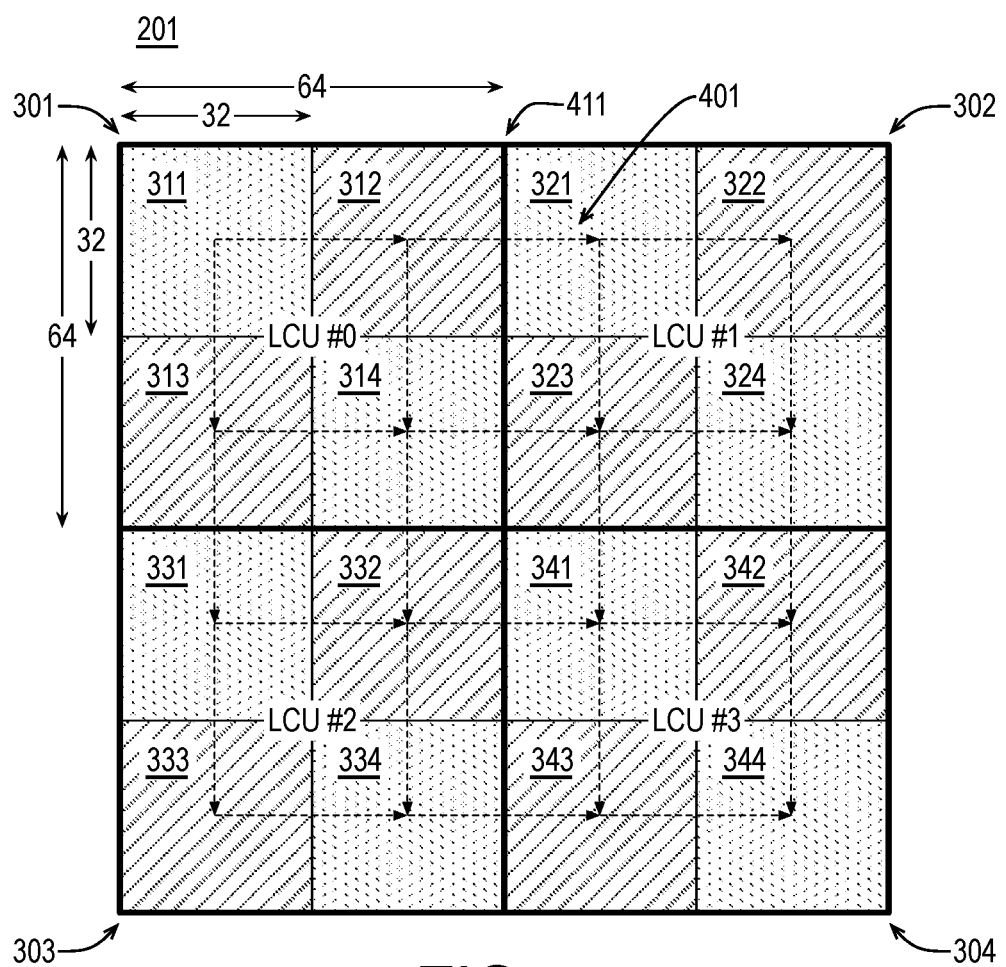
FIG. 4 illustrates an example coding unit processing order for coding units of neighboring largest coding units.
Figure 5:
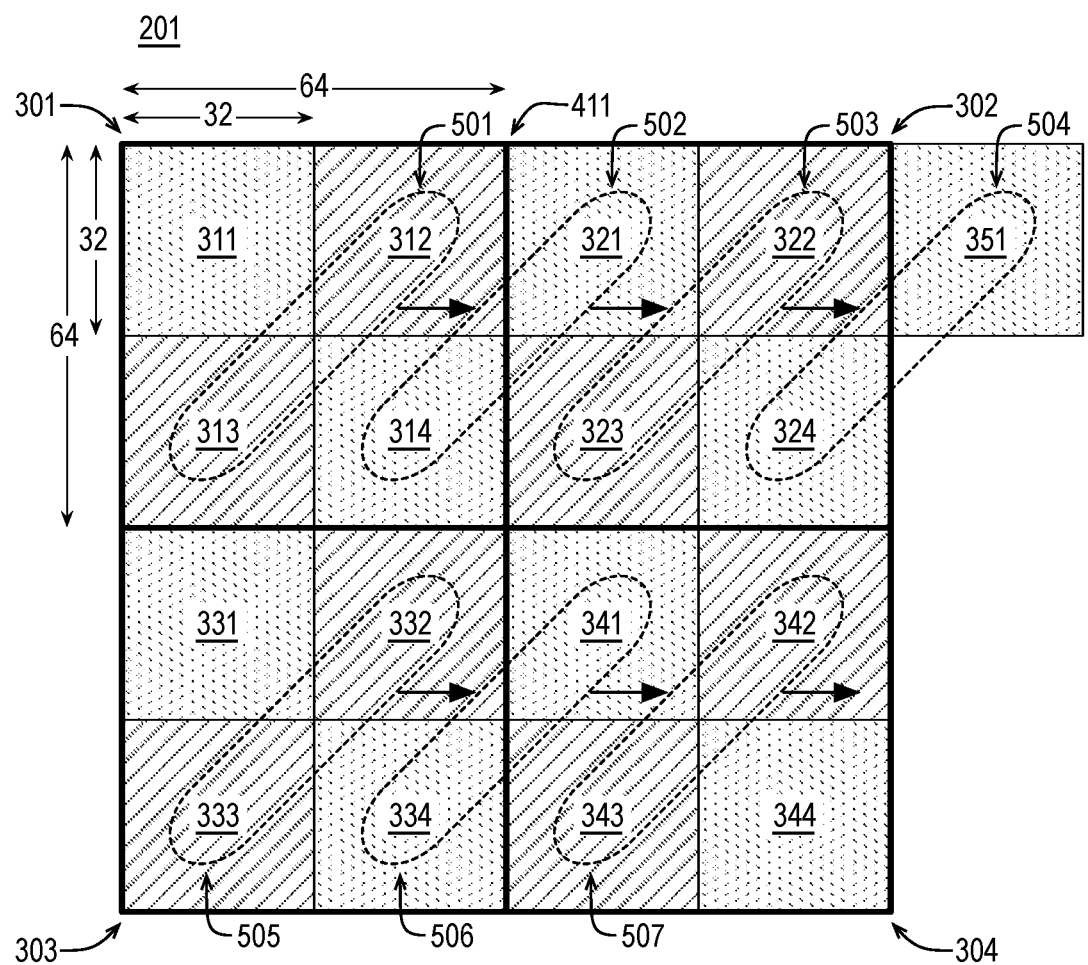
FIG. 5 illustrates example parallel partitioning and coding mode selection coding unit pairs for coding units of neighboring largest coding units.

In the context of FIGS. 3, 4, and 5, it is noted that the largest coding unit processing order of largest coding units 301, 302, 303, 304 is such that largest coding unit 302 is processed immediately subsequent to largest coding unit 301, largest coding unit 304 is processed immediately subsequent to largest coding unit 303, and such that largest coding unit 303 is processed subsequent to (although not necessarily immediately subsequent to) largest coding unit 302.

FIG. 4 illustrates an example coding unit processing order 401 for coding units of neighboring largest coding units 301, 302, 303, 304, arranged in accordance with at least some implementations of the present disclosure. As shown in FIG. 4, using shading of the coding units, partitioning and coding mode decisions are made in parallel for particular diagonal coding units of largest coding units 301, 302, 303, 304 such that coding units shaded with dots may be processed in parallel and coding shaded with diagonal lines may be processed in parallel. Furthermore, as shown with respect to coding unit processing order 401, partitioning and coding mode decisions are first made for coding unit 311. Then, coding unit processing order 401 moves to processing coding units 312, 313 such that partitioning and coding mode decisions are made in parallel for coding units 312, 313 (e.g., upper-right and lower-left coding units of the same largest coding unit 301).

Next, coding unit processing order 401 moves to processing coding units 314, 321 such that partitioning and coding mode decisions are made in parallel for coding units 314, 321 (e.g., an upper-left coding unit of largest coding unit 302 and lower-right coding unit of largest coding unit 301). Notably, the parallel processing of coding units 314, 321 crosses a boundary 411 between largest coding units 301, 302). Coding unit processing order 401 next moves to processing partitioning and coding mode decisions in parallel for coding units 322, 323 (e.g., upper-right and lower-left coding units of the same largest coding unit 302). Such processing may continue to the right for any number of largest coding units.

Subsequently, as shown via coding unit processing order 401, processing continues at coding unit 331, where for instances where largest coding units 301, 303 are at a left frame boundary or a left wavefront boundary, coding unit 331 is not performed in parallel with another coding unit or is performed in parallel with a lower-right coding unit at a right frame boundary or a right wavefront boundary. Processing then continues in for largest coding units 303, 304 as discussed with respect to largest coding units 301, 302 such that coding unit processing order 401 moves to processing coding units 332, 333 with partitioning and coding mode decisions made in parallel for coding units 332, 333 (e.g., upper-right and lower-left coding units of the same largest coding unit 303). then to processing coding units 334, 341 such that partitioning and coding mode decisions are made in parallel for coding units 334, 341 (e.g., an upper-left coding unit of largest coding unit 304 and lower-right coding unit of largest coding unit 303), and next to processing partitioning and coding mode decisions in parallel for coding units 342, 343 (e.g., upper-right and lower-left coding units of the same largest coding unit 304). Such processing then continues to the right for any number of largest coding units and subsequently below largest coding unit 303 and so on according to an overlying largest coding unit scan order.

FIG. 5 illustrates example parallel partitioning and coding mode selection coding unit pairs for coding units of neighboring largest coding units 301, 302, 303, 304, arranged in accordance with at least some implementations of the present disclosure. As shown in FIG. 5 and as discussed with respect to FIG. 4, partitioning and coding mode selection is made in parallel for a coding pair 501 including coding units 312, 313 (e.g., upper-right and lower-left coding units of the same largest coding unit 301). Immediately subsequent to the parallel partitioning and coding mode selection for coding units 312, 313, partitioning and coding mode decisions are made in parallel for a coding pair 502 including coding units 314, 321 (e.g., an upper-left coding unit of largest coding unit 302 and lower-right coding unit of largest coding unit 301). Immediately subsequent to the parallel partitioning and coding mode selection for coding pair 502, partitioning and coding mode decisions are made in parallel for a coding pair 503 including coding units 322, 323 and then for a coding pair 504 including coding unit 324 and a coding unit 351, which is an upper-left coding unit of a largest coding unit horizontally aligned with and immediately to the right of largest coding unit 302.

Similarly, partitioning and coding mode selection is made in parallel for a coding pair 505 including coding units 332, 333 (e.g., upper-right and lower-left coding units of the same largest coding unit 303). Immediately subsequent to coding pair 505, partitioning and coding mode decisions are made in parallel for a coding pair 506 including coding units 334, 341 (e.g., an upper-left coding unit of largest coding unit 304 and lower-right coding unit of largest coding unit 303). Immediately subsequent to the parallel partitioning and coding mode selection for coding pair 506, partitioning and coding mode decisions are made in parallel for a coding pair 507 including coding units 342, 343 and so on.

As discussed, in video compression, a video frame is broken up into largest coding units and coding units and so on such that the partitioned units (at a selected partitioning level) are predicted using information from neighbor blocks (intra or spatial prediction) or from prior frames (inter or temporal prediction, which may also use motion vectors from neighbor blocks as merge and/or skip candidates or the like). Some of the compression benefit comes from using the information of neighbor coding units to assist the current coding unit prediction.

Notably, the advanced neighbor dependency management techniques discussed herein break dependencies at the sub-largest coding unit (e.g., 64×64) level such that the dependencies are broken, for example, at the coding unit (e.g., 32×32 and smaller) level to improve concurrency within the processing of the 64×64 largest coding unit to reduce total processing time of the 64×64 largest coding unit. Such techniques may be used in conjunction with any largest coding unit level parallelization techniques (as discussed further herein) to attain further throughput improvements with minimal loss in quality.

Figures 6, 7:
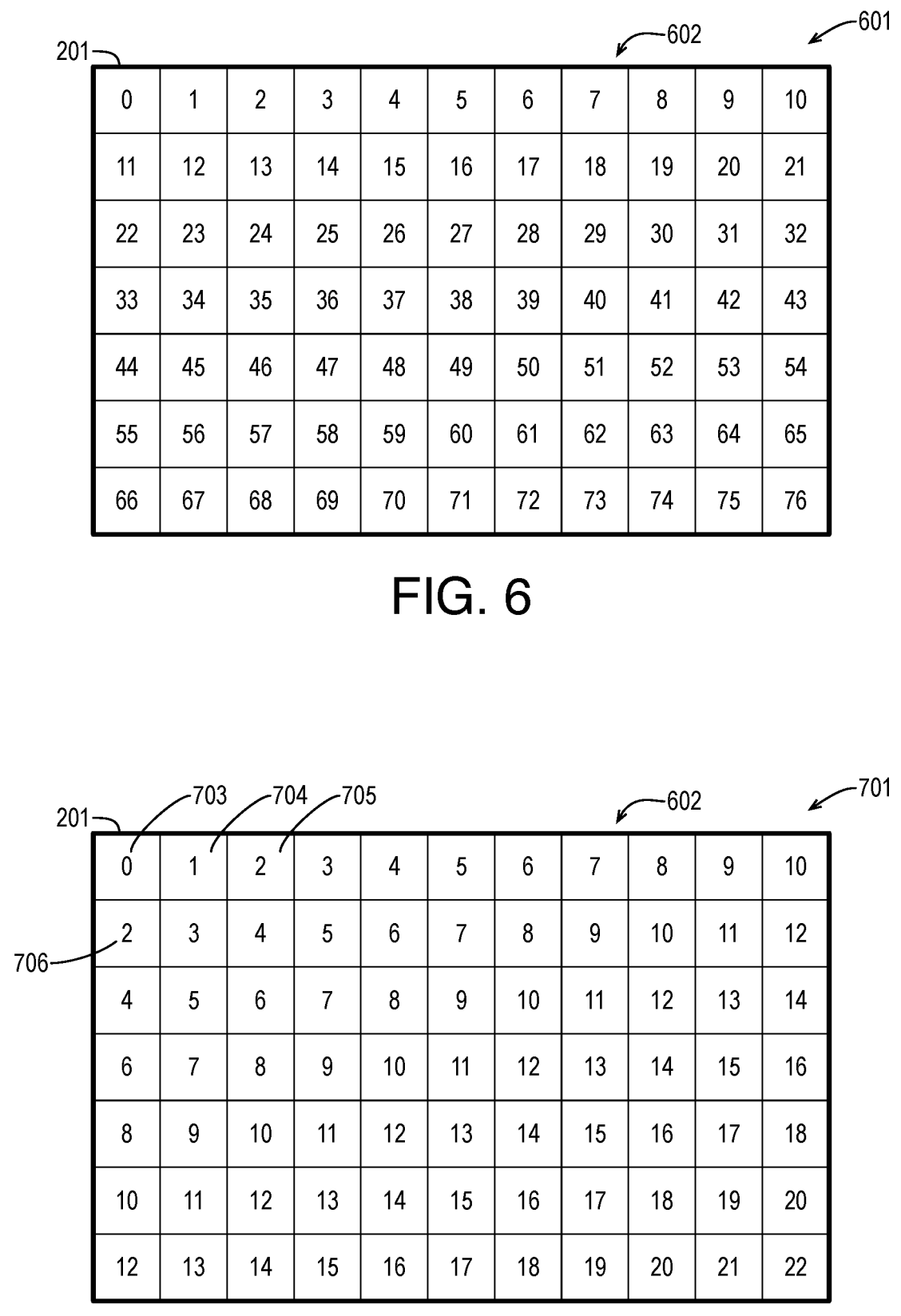

FIG. 6 illustrates an example raster scan order 601 for processing largest coding units of video frame 201, arranged in accordance with at least some implementations of the present disclosure. As shown, video frame 201 is divided or partitioned into a number of largest coding units 602 in analogy with largest coding units 203, 204, 301, 302, 303, 304 as discussed herein. Largest coding units 602 may be any suitable size such as 64×64 pixel blocks. In the illustrated example, video frame 201 is divided into 77 largest coding units for the sake of clarity of presentation. However, in practice, video frame 201 may be divided into hundreds or thousands of largest coding units. In FIG. 6, each largest coding unit is assigned a number according to the order in which partitioning and coding mode selection are to implemented. Notably, the techniques discussed with respect to FIGS. 3-5 and elsewhere herein may be implemented for immediately adjacent largest coding units that are sequential in raster scan order 601. For example, the discussed techniques, which provide parallel coding unit partitioning and coding mode selection across vertical boundaries followed by parallel coding unit partitioning and coding mode selection within the largest coding unit to the right of the boundary, may be implemented with respect to the largest coding units at order positions 0 and 1, the largest coding units at order positions 1 and 2, the largest coding units at order positions 2 and 3, and so on. Notably, raster scan order 601 (e.g., a raster walk) goes from left to right of video frame 201 (beginning at a top left corner) through a top row, moves down to a next row, goes from left to right through that row, moves down to a next row, and so on.

FIG. 7 illustrates an example wavefront scan order 701 for processing largest coding units of video frame 201, arranged in accordance with at least some implementations of the present disclosure. As shown, in contrast to a raster scan order, the largest coding units of video frame 201 are assigned to a wavefront such that partitioning and coding mode selections for each largest coding unit in the wavefront may be processed in parallel. For example, each wavefront may be established such that, prior to selecting a partitioning and coding modes for each largest coding unit, the partitioning and coding modes are selected for all largest coding units above, to the left, and above and to the right of each largest coding unit (except for those largest coding units on top and left boundaries of video frame). For example, largest coding unit 703 is assigned to wavefront 0, largest coding unit 704 is assigned to wavefront 1, and largest coding units 703, 704 cannot be processed (e.g., selection of partitioning and coding modes) in parallel with any other largest coding units. Largest coding units 705, 706 are assigned to wavefront 2 and can be processed in parallel after wavefront 1 is complete (i.e., after largest coding unit 704 is processed), and so on such that each largest coding unit order number in FIG. 7 indicates a wavefront and each largest coding unit in a wavefront can be processed in parallel. As a further example, wavefront 7, including four largest coding units each labeled with a 7, is processed after completion of wavefront 6, including four largest coding unit each labeled with a 6.

As with the example of FIG. 6, the techniques discussed with respect to FIGS. 3-5 and elsewhere herein may be implemented for immediately adjacent largest coding units that are sequential in wavefront scan order 701. For example, the discussed techniques, which provide parallel coding unit partitioning and coding mode selection across vertical boundaries followed by parallel coding unit partitioning and coding mode selection within the largest coding unit to the right of the boundary, may be implemented with respect to the largest coding units at order positions 0 and 1, the largest coding units at order positions 1 and 2, both instances of largest coding units at order positions 2 and 3, both instances of largest coding units at order positions 3 and 4, all three instances of largest coding units at order positions 4 and 5, and so on. Notably, wavefront scan order 701, which provides waves of parallel processed block moving from a top-left of video frame 201 to a bottom-right of video frame 201 may be at least partially enabled by the architecture discussed with respect to system 100. For example, the two pass architecture of system 100, where motion estimation and partitioning and mode selection are performed in a first pass (e.g., by parallel partitioning and mode selection module 111) and coding to a bitstream is performed in a second pass (e.g., by encode module 112).

FIG. 8 illustrates an example wavefront scan order 801 with a wavefront split boundary 805 for processing largest coding units of video frame 201, arranged in accordance with at least some implementations of the present disclosure. As shown, wavefront split boundary 805 is established within video frame 401. As used herein, wavefront split boundary 805 provides a boundary between blocks of video frame 201 such that, across the boundary, the assignment of blocks to wavefronts within the video frame is restarted. For example, in the top left region 803 of video frame 201, wavefronts are established (as with wavefront scan order 701) such that partitioning and coding mode selection for a current largest coding unit awaits partitioning and coding mode selection for those largest coding units having a lower order number. Similarly, in lower right region 807, wavefronts are also established such that partitioning and coding mode selection for a current largest coding unit awaits partitioning and coding mode selection for those largest coding units having a lower order number. Notably, largest coding units of such wavefronts across wavefront split boundary 805 may also be processed in parallel. For example, all largest coding units with order number 0s (in both regions 803, 807) may be run in parallel, all largest coding units with order number 1s (in both regions 803, 807) may be run in parallel, all largest coding units with order number 2s (in both regions 803, 807) may be run in parallel, and so on. Thereby, wavefront split boundary 805 provides increased parallelization particularly at the warm up period of region 803 and the cool down period of region 807.

As with the examples of FIGS. 6 and 7, the techniques discussed with respect to FIGS. 3-5 and elsewhere herein may be implemented for immediately adjacent largest coding units that are sequential in wavefront scan order 801. For example, the discussed techniques, which provide parallel coding unit partitioning and coding mode selection across vertical boundaries followed by parallel coding unit partitioning and coding mode selection within the largest coding unit to the right of the boundary, may be implemented at all instances of largest coding units at order positions 0 and 1 (e.g., six instances in FIG. 8—one in region 803 and five in region 807), at all instances of largest coding units at order positions 1 and 2 (e.g., six instances in FIG. 8—one in region 803 and five in region 807), at all instances of largest coding units at order positions 2 and 3 (e.g., seven instances in FIG. 8—two in region 803 and five in region 807), all instances of largest coding units at order positions 3 and 4 (e.g., six instances in FIG. 8—two in region 803 and four in region 807), and so on. Notably, wavefront scan order 801 provides waves of parallel processed block moving from a top-left of video frame 201 to wavefront split boundary 805 and from wavefront split boundary 805 to a bottom-right of video frame 201 but may induce visual artifacts just below and to the right of wavefront split boundary 805.

Figure 9:
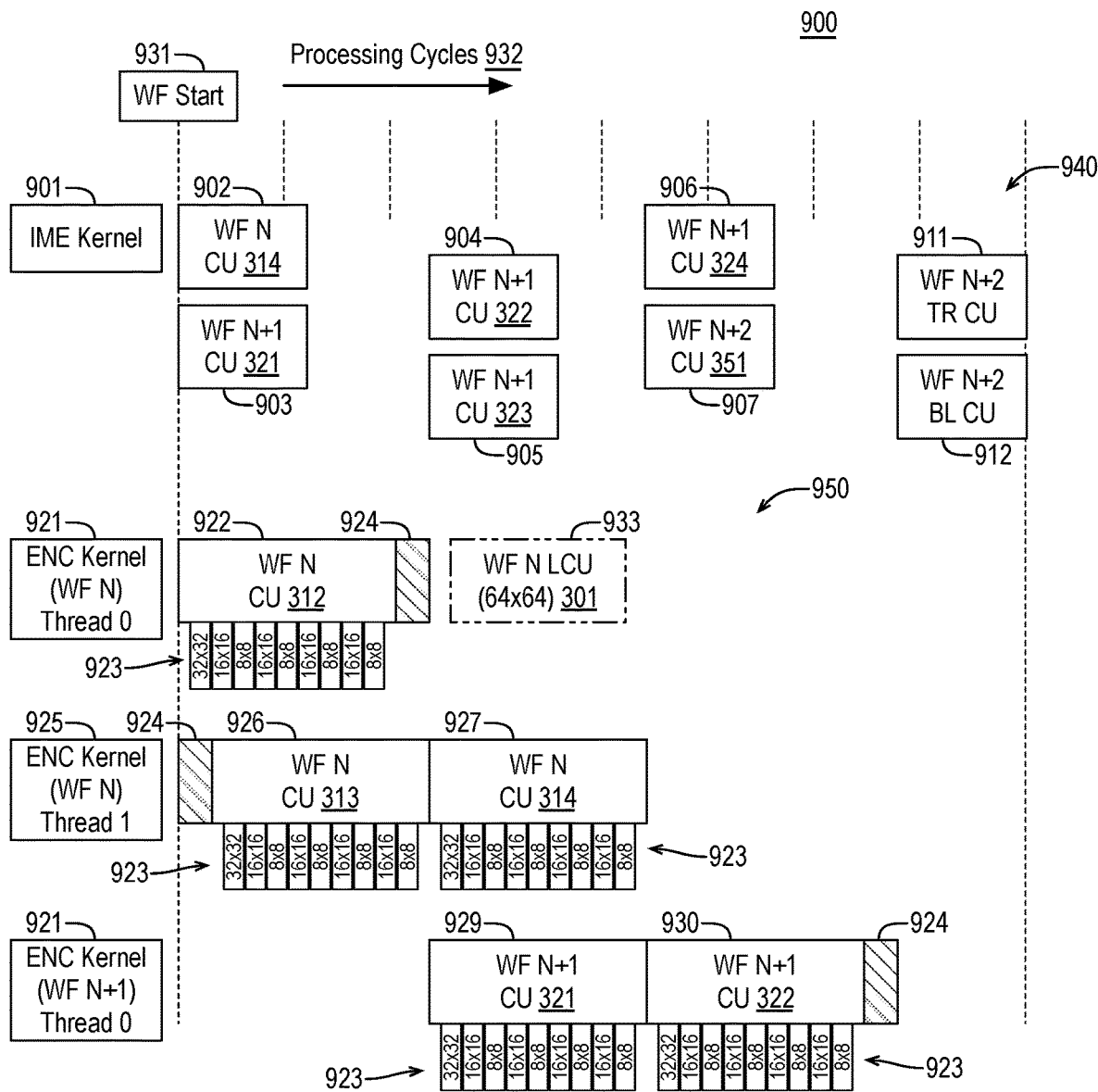
FIG. 9 is an illustrative diagram of example parallel processing for partitioning and coding mode selection.

FIG. 9 is an illustrative diagram of example parallel processing 900 for partitioning and coding mode selection, arranged in accordance with at least some implementations of the present disclosure. For example, parallel processing 900 may be implemented via parallel partitioning and mode selection module 111. In some embodiments, parallel partitioning and mode selection module 111 is implemented by one or more multi-core processors to perform parallel processing 900. In the example of FIG. 9, the start of a wavefront (WF start) 931 is indicated at the start of processing of largest coding unit 302 and increasing processing cycles 932 are illustrated through the completion of processing of largest coding unit 302. Such processing may take any number of processing cycles 932, which are illustrated to present the staged and parallel processing of the techniques discussed herein.

In parallel processing 900, a two stage or phase approach is implemented with an integer motion estimation (IME) stage 940 and a final encode selections stage 950. As shown, IME stage 940 is implemented for each coding unit by making a call to an IME kernel 901, which processes the pertinent coding unit and outputs, for example, a best candidate motion vector and other information for use by final encode selections stage 950. In some embodiments, IME kernel 901 performs a motion search at only the coding unit (e.g., 32×32) level and outputs the resultant best candidate motion vector. As shown, at wavefront start 931, such IME processing is performed for coding unit 314 and coding unit 321 in parallel, using IME calls 902, 903, respectively. In the context of FIG. 9, a call is made to perform a process, which takes a particular number of processing (or clock) cycles 932 and therefore a call label is used to indicate the call to the process and the process itself.

Furthermore, final encode selections stage 950 is implemented for each coding unit by making a call to a final encode selections (ENC) kernel thread including ENC kernel thread 0 921 and ENC kernel thread 1 925. As shown, when ENC kernel thread 0 921 opens for processing, it may be applied to another wavefront. Although illustrated with respect to two ENC kernel threads, any number may be employed. Furthermore, the term ENC is used to indicate final encode selections are made via final encode selections stage 950 but not to indicate coding to a bitstream, which, in some embodiments is performed subsequent to parallel processing 900, as discussed with respect to system 100. In other embodiments, such final encode selections and coding to a bitstream are pipelined and also run, at least partially, in parallel.

Returning to wavefront start 931, as shown, final encode selections stage 950 processing is performed in parallel for coding unit 312 and coding unit 313. Notably, IME stage 940 was previously performed for coding unit 312 and coding unit 313. Final encode selections stage 950 for coding unit 312 (a part of wavefront N) is performed by making a call 922 to ENC kernel thread 0 921 (or any available thread instance), which performs processes 923 to evaluate partitions and coding modes for coding unit 312 inclusive of inter coding modes (using the results of the IME stage for coding unit 312 and neighbor motion vector candidates, if available) and intra coding modes at various partitioning levels. In the illustrated example, processes 923 first evaluate inter and intra coding modes at the coding unit level (e.g., 32×32), then for a top-left partition of the coding unit (e.g., a top-left 16×16), then for all 8×8s of the top-left 16×16, then for a top-right partition of the coding unit (e.g., a top-right 16×16), then for all 8×8s of the top-right 16×16, then for a bottom-left partition of the coding unit (e.g., a bottom-left 16×16), then for all 8×8s of the bottom-left 16×16, then for a bottom-right partition of the coding unit (e.g., a bottom-right 16×16), then for all 8×8s of the bottom-right 16×16, in a nested manner until a best partitioning and coding modes for coding unit 312 is determined. As shown, after call 922, an overhead 924 may occur, which is necessary to prepare for subsequent processing.

As shown, call 922 is performed in parallel with a call 926 to process final encode selections stage 950 for coding unit 313. As discussed further herein, such parallel processing of coding units 312, 313 requires breaking of some available encode dependencies. Call 923 is made to ENC kernel thread 1 925 (or any available thread instance), which performs processes 923 to evaluate partitions and coding modes for coding unit 313 inclusive of inter coding modes (using the results of the IME stage for coding unit 313 and neighbor motion vector candidates, if available) and intra coding modes at various partitioning levels, as discussed with respect to call 922.

After completion of coding units 312, 313, final encode selections stage 950 may commence for coding units 314, 321, which have also completed IME stage 940 processing. A call 927 to process final encode selections stage 950 for coding unit 314 is performed in parallel with a call 929 to process final encode selections stage 950 for coding unit 321. As discussed further herein, such parallel processing of coding units 314, 321 requires breaking of some available encode dependencies. Call 927 is made to ENC kernel thread 1 925 (or any available thread instance), which performs processes 923 to evaluate partitions and coding modes for coding unit 314 inclusive of inter coding modes and intra coding modes at various partitioning levels. In parallel, call 929 is made to ENC kernel thread 0 921 (or any available thread instance), which performs processes 923 to evaluate partitions and coding modes for coding unit 321.

Furthermore, in parallel with final encode selections stage 950 processing for coding units 314, 321, IME processing is performed for coding unit 322 and coding unit 323 in parallel, using IME calls 904, 905. Such processing continues in a two stage parallel manner inclusive of implementing a call 930 to process final encode selections stage 950 for coding unit 322, which is in parallel with the processing final encode selections stage 950 for coding unit 323 (not shown in FIG. 9). In parallel with final encode selections stage 950 processing for coding units 322, 323, IME processing is performed for coding unit 324 and coding unit 351 in parallel, using IME calls 906, 907. Furthermore, in parallel with final encode selections stage 950 processing for coding units 324, 351 (not shown), IME processing is performed for the top-right coding unit and the bottom-left coding unit of the largest coding unit including coding unit 351 using IME calls 911, 912.

Parallel processing 900 also indicates an optional LCU level call 933, which is only used when both the top-left and top-right coding units of a largest coding unit both indicate a 32×32 partition as the best result. For example, if both coding unit 311 (processed prior to the instance illustrated in FIG. 9) and coding unit 312, in response to final encode selections stage 950 processing have 32×32 (e.g., no partitioning) as their final selections (along with any coding mode), then LCU level call 933 is made in parallel with calls 927, 929. If either or both of coding units 311, 312 do not have 32×32 as their final selections, then LCU level call 933 is bypassed. In some embodiments, LCU level call 933 includes only a merge motion vector evaluation (e.g., not a full 64×64 and no intra evaluation) such that only available merge motion vector candidates are tested and the LCU level result (e.g., rate distortion) is compared with other partitions and mode options. Thereby, the process of LCU level call 933 requires fewer processing cycles 932 and can be performed in the processing cycles allocated to processes 923.

Figure 10:
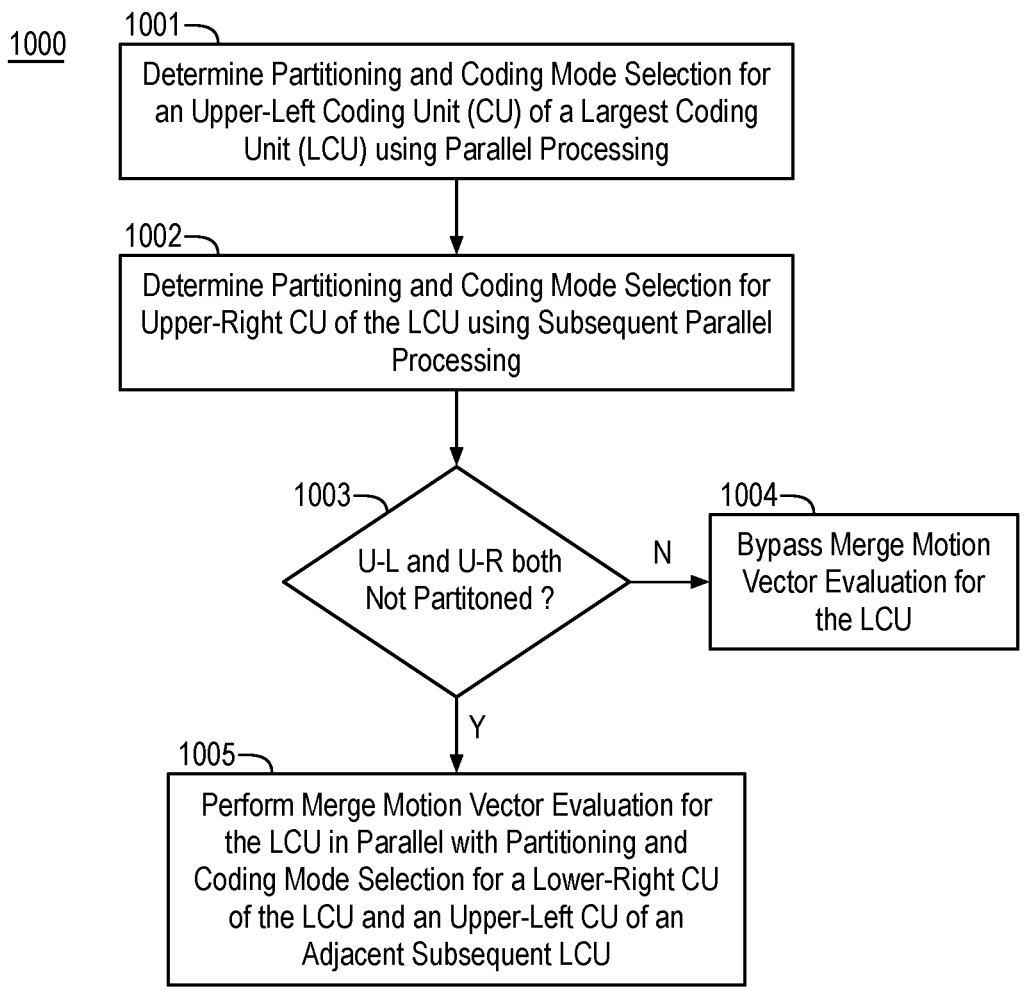
FIG. 10 is a flow diagram illustrating an example process for providing optional largest coding unit evaluation.

FIG. 10 is a flow diagram illustrating an example process 1000 for providing optional largest coding unit evaluation, arranged in accordance with at least some implementations of the present disclosure. Process 1000 may include one or more operations 1001-1005 as illustrated in FIG. 10. Process 1000 may be performed by a device (e.g., system 100 as discussed herein).

Processing begins at operation 1001, where a partitioning and coding mode selection is made for a top-left (or upper-left) coding unit of a current largest coding unit using the parallel partitioning and coding mode selection techniques discussed herein. In some embodiments, the partitioning and coding mode selection for the upper-left coding unit of the current largest coding unit is performed in parallel with the partitioning and coding mode selection for the bottom-right coding unit of a largest coding unit prior to (e.g., to the left of) the current largest coding unit.

Processing continues at operation 1002, where a partitioning and coding mode selection is made for a top-right (or upper-right) coding unit of the current largest coding unit using the parallel partitioning and coding mode selection techniques discussed herein. In some embodiments, the partitioning and coding mode selection for the upper-right coding unit of the current largest coding unit is performed in parallel with the partitioning and coding mode selection for the bottom-left coding unit of the current largest coding unit.

Processing continues at decision operation 1003, where a determination is made as to whether, for both the upper-left and upper-right coding units of the current largest coding unit, the partitioning and coding mode selection provides no partitioning (e.g., both the upper-left and upper-right coding units are to be coded without partitioning for prediction and being predicted using the full size of the coding unit, such as 32×32). If not, processing continues at operation 1004, where merge motion vector evaluation for the current largest coding unit is bypassed. If so, processing continues at operation 1004, where merge motion vector evaluation for the current largest coding unit is performed in parallel with partitioning and coding mode selection for a lower-right coding unit of the current largest coding unit and an upper-left coding unit of an adjacent and subsequent largest coding unit (e.g., the largest coding unit horizontally aligned with and immediately to the right of the current largest coding unit).

Returning to FIG. 9 and with reference to FIGS. 3-5, as discussed, some previously available coding dependencies are broken to provide parallel processing 900. In some embodiments, the IME stage 940 dependencies are adjusted to use the IME based result instead of a final motion vector. For example, typically, IME for coding unit 321 uses the motion vector from coding unit 312 and the motion vector for largest coding unit 301. However, herein, for IME, coding unit 321 uses the motion vector from coding unit 312 in the merge candidate list but does not use of the motion vector for largest coding unit 301 in the merge candidate list. In some embodiments, performing IME for an upper-left coding unit of a current largest coding unit uses a resultant motion vector corresponding to an upper-right coding unit of an adjacent largest coding unit horizontally aligned and to the left of the current largest coding unit as a motion vector merge candidate and disables usage of a motion vector merge candidate corresponding to the adjacent largest coding unit. Furthermore, typically, IME for coding unit 323 uses the motion vector from coding unit 322. However, herein, for IME, coding unit 323 does not use the motion vector from coding unit 322 in the merge candidate list. In some embodiments, performing IME for a lower-left coding unit of a current largest coding unit disables usage of a motion vector merge candidate corresponding to an upper-right coding unit of the current largest coding unit. The quality impact of theses changes is small since the final motion vector decision may use the corrected motion vector when the fractional decision is made.

As discussed with respect to FIG. 10, a 64×64 call (e.g., merge call) for largest coding unit 302 is made in parallel with a call for coding unit 324 if and only if the final partitioning decision for coding units 321, 322 indicate no partitioning (e.g., 32×32 coding units instead of smaller partitions). In some embodiments, parallel processing includes determining whether a partitioning and coding mode selection for an upper-left coding unit of a current largest coding unit indicates no partitioning and a partitioning and coding mode selections for an upper-right coding unit of the current largest coding unit also indicates no partitioning and performing a merge motion vector evaluation for the current largest coding unit in response to the partitioning and coding mode selections indicating no partitionings or bypassing the merge motion vector evaluation in response to either or both of the partitioning and coding mode selections indicating additional partitionings. For example, calling 64×64 dynamically reduces the operations required in the hardware implementing final encode selections stage 950 for improve performance. As discussed, the 64×64 call is also optimized to perform only merge motion vector evaluation to fit within the same number of processing cycles (and time) required to perform processes 923 (e.g., a final partitioning and mode selection for 32×32).

As discussed, partitioning and coding mode selection for coding unit 321 runs in parallel with partitioning and coding mode selection for coding unit 314. Since partitioning and coding mode selection for coding unit 314 is not completed prior to partitioning and coding mode selection for coding unit 321, the bottom-left dependency from coding unit 321 to coding unit 314. In some embodiments, performing partitioning and coding mode selection for an upper-left coding unit of a current largest coding unit and partitioning and coding mode selection for a lower-right coding unit of a prior largest coding unit in parallel includes breaking a bottom-left coding dependency from the upper-left coding unit of the current largest coding unit to the lower-right coding unit of the prior largest coding unit. Furthermore, partitioning and coding mode selection for coding unit 321 uses the final decisions from coding unit 312 (and without use of a final decision for largest coding unit 301). However, since the partitioning and coding mode selection for coding unit 312 must be no partitioning (e.g., 32×32) for the largest coding unit call to be made (as discussed), the quality impact is small since the no partitioning (e.g., 32×32) motion vector typically aligns with the final largest coding unit selection.

In addition, partitioning and coding mode selection for coding unit 322 an partitioning and coding mode selection for coding unit 322 run in parallel, which breaks the top-right dependency from coding unit 323 to coding unit 322. In some embodiments, performing the partitioning and coding mode selection for an upper-right coding unit of a current largest coding unit and partitioning and coding mode selection for a lower-left coding unit of the current largest coding unit in parallel includes breaking an upper-right coding dependency from the lower-left coding unit of the current largest coding unit to the upper-right coding unit of the current largest coding unit.

The discussed dependency changes allow the two stage efficient partitioning and coding mode selection discussed herein.

Figure 11:
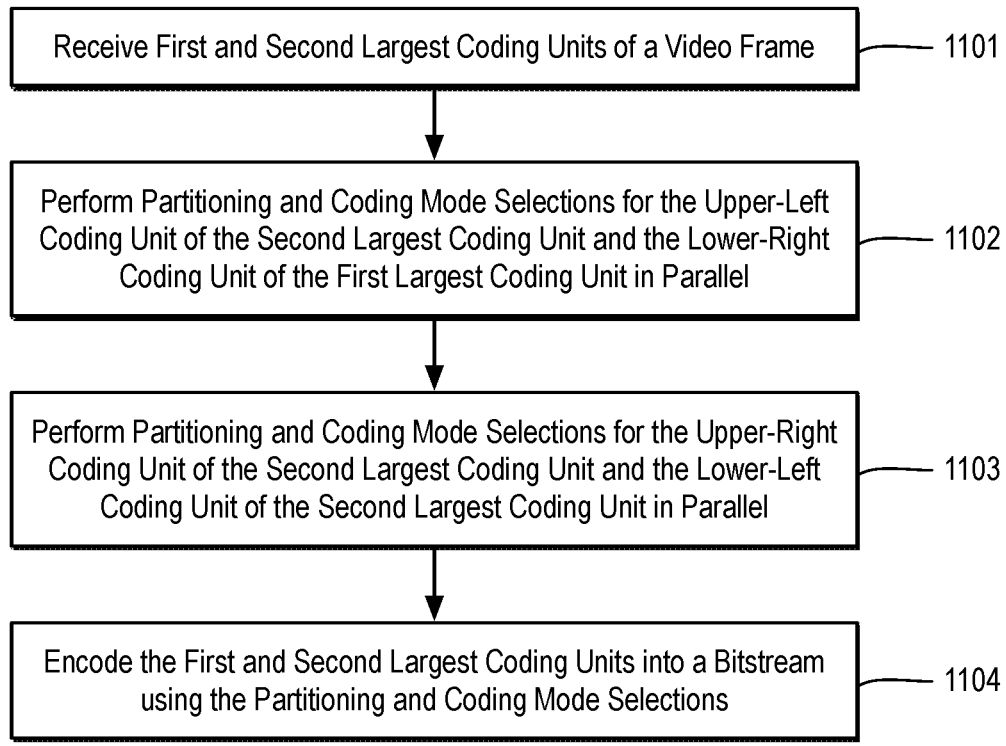
FIG. 11 is a flow diagram illustrating an example process for video coding.

FIG. 11 is a flow diagram illustrating an example process 1100 for video coding, arranged in accordance with at least some implementations of the present disclosure. Process 1100 may include one or more operations 1101-1104 as illustrated in FIG. 11. Process 1100 may form at least part of a video coding process. By way of non-limiting example, process 1100 may form at least part of a video coding process as performed by any device or system as discussed herein such as system 100. Furthermore, process 1100 will be described herein with reference to system 1200 of FIG. 12.

Figure 12:
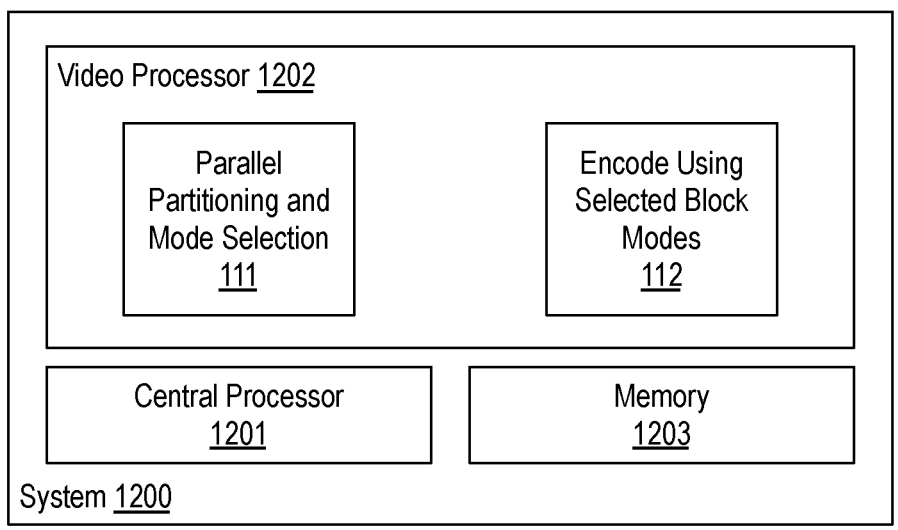
FIG. 12 is an illustrative diagram of an example system for video coding.

FIG. 12 is an illustrative diagram of an example system 1200 for video coding, arranged in accordance with at least some implementations of the present disclosure. As shown in FIG. 12, system 1200 may include a central processor 1201, a video processor 1202, and a memory 1203. Also as shown, video processor 1202 may include or implement parallel partitioning and mode selection module 111 and encode module 112. In an embodiment, memory 1203 implements a frame buffer to store video frames and partitions thereof. Furthermore, in the example of system 1200, memory 1203 may store video data or related content such as frame data, largest coding unit data, coding unit data, partitioning and coding mode decision data, bitstream data, and/or any other data as discussed herein.

As shown, in some embodiments, parallel partitioning and mode selection module 111 and encode module 112 are implemented via video processor 1202. In other embodiments, one or more or portions of parallel partitioning and mode selection module 111 and encode module 112 are implemented via central processor 1201 or another processing unit such as an image processor, a graphics processor, or the like. Notably, parallel partitioning and mode selection module 111 may be advantageously implemented via a multicore processor as discussed herein. However, in some embodiments, parallel block coding mode decision processing may be performed in parallel on resources from different processors.

Video processor 1202 may include any number and type of video, image, or graphics processing units that may provide the operations as discussed herein. Such operations may be implemented via software or hardware or a combination thereof. For example, video processor 1202 may include circuitry dedicated to manipulate frames, frame data, or the like obtained from memory 1203. Central processor 1201 may include any number and type of processing units or modules that may provide control and other high level functions for system 1200 and/or provide any operations as discussed herein. Memory 1203 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1203 may be implemented by cache memory.

In an embodiment, one or more or portions of parallel partitioning and mode selection module 111 and encode module 112 are implemented via an execution unit (EU). The EU may include, for example, programmable logic or circuitry such as a logic core or cores that may provide a wide array of programmable logic functions. In an embodiment, one or more or portions of parallel partitioning and mode selection module 111 and encode module 112 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 11, process 1100 begins at operation 1101, where first and second largest coding units of a video frame are received for partitioning and coding mode selection. In some embodiments, the second largest coding unit is horizontally aligned with and immediately to the right of the first largest coding unit and each of the first and second largest coding units includes upper-left, upper-right, lower-left, and lower-right coding units. The first and second largest coding units may be at any location in the video frame. As discussed, in a coding order, the first largest coding unit immediately precedes the second largest coding unit. In some embodiments, the first coding unit is in a first largest coding unit wavefront and the second coding unit is in a second largest coding unit wavefront. Furthermore, the first and second largest coding units may be of any suitable size. In some embodiments, the first and second largest coding units are 64×64 pixels and each of the upper-left, upper-right, lower-left, and lower-right coding units are 32×32 pixels.

Processing continues at operation 1102, where first partitioning and coding mode selections are performed or made for the upper-left coding unit of the second largest coding unit and second partitioning and coding mode selections for the lower-right coding unit of the first largest coding unit are performed or made in parallel. As discussed, such parallel processing provides the first and second partitioning and coding mode selections overlap at least partially temporally. In some embodiments, the first and second partitioning and coding mode selections are performed by different cores, execution units, or the like of the same processor. In some embodiments, the first partitioning and coding mode selections for the upper-left coding unit of the second largest coding unit are performed by a first execution unit of a processor and the second partitioning and coding mode selections for the lower-right coding unit of the first largest coding unit are performed by a second execution unit of the processor. As discussed, such parallel processing may break coding dependencies. In some embodiments, performing the first partitioning and coding mode selections for the upper-left coding unit of the second largest coding unit and the second partitioning and coding mode selections for the lower-right coding unit of the first largest coding unit in parallel comprises breaking a bottom-left coding dependency from the upper-left coding unit of the second largest coding unit to the lower-right coding unit of the first largest coding unit.

Processing continues at operation 1103, where, immediately subsequent to the first and second partitioning and coding mode selections, third partitioning and coding mode selections are performed or made for the upper-right coding unit of the second largest coding unit and fourth partitioning and coding mode selections are performed or made for the lower-left coding unit of the second largest coding unit in parallel. As discussed, the term immediately subsequent with respect to such partitioning and coding mode selections indicates partitioning and coding mode selections are not made for any other intervening coding units. In some embodiments, the third and fourth partitioning and coding mode selections are performed by different cores, execution units, or the like of the same processor. In some embodiments, the third partitioning and coding mode selections for the upper-left coding unit of the second largest coding unit are performed by a first execution unit of a processor and the fourth partitioning and coding mode selections for the lower-right coding unit of the first largest coding unit are performed by a second execution unit of the processor. As discussed, such parallel processing may break coding dependencies. In some embodiments, performing the third partitioning and coding mode selections for the upper-right coding unit of the second largest coding unit and the fourth partitioning and coding mode selections for the lower-left coding unit of the second largest coding unit in parallel comprises breaking an upper-right coding dependency from the lower-left coding unit of the second largest coding unit to the upper-right coding unit of the second largest coding unit.

In some embodiments, process 1100 further includes performing first integer motion estimation for the upper-left coding unit of the second largest coding unit and second integer motion estimation for the lower-right coding unit of the first largest coding unit in parallel, performing, immediately subsequent to the first and integer motion estimations, third integer motion estimation for the upper-right coding unit of the second largest coding unit and fourth integer motion estimation for the lower-left coding unit of the second largest coding unit in parallel, wherein the first, second, third, and fourth partitioning and coding mode selections are based on the first, second, third, and fourth motion estimations, respectively. In some embodiments, performing the first integer motion estimation for the upper-left coding unit of the second largest coding unit uses a first resultant motion vector corresponding to the upper-right coding unit of the first largest coding unit as a motion vector merge candidate and disables usage of a motion vector merge candidate corresponding to the first largest coding unit. In some embodiments, performing the fourth integer motion estimation for the lower-left coding unit of the second largest coding unit disables usage of a motion vector merge candidate corresponding to the upper-right coding unit of the second largest coding unit.

In some embodiments, process 1100 further includes determining whether the first partitioning and coding mode selections for the upper-left coding unit of the second largest coding unit comprises no partitioning and the third partitioning and coding mode selections for the upper-right coding unit of the second largest coding unit comprises no partitioning, performing a merge motion vector evaluation for the second largest coding unit in response to the first and third partitioning and coding mode selections comprising no partitionings or bypassing the merge motion vector evaluation for the second largest coding unit in response to either or both of the first and third partitioning and coding mode selections comprising additional partitionings. In some embodiments, process 1100 further includes receiving a third largest coding unit of the video frame, wherein the third largest coding unit is horizontally aligned with and immediately to the right of the second largest coding unit and the third largest coding unit comprises upper-left, upper-right, lower-left, and lower-right coding units and performing, immediately subsequent to the third and fourth partitioning and coding mode selections, fifth partitioning and coding mode selections for the upper-left coding unit of the third largest coding unit and sixth partitioning and coding mode selections for the lower-right coding unit of the second largest coding unit in parallel, wherein performing or bypassing the merge motion vector evaluation for the second largest coding unit is in parallel with the fifth and sixth partitioning and coding mode selections.

Processing continues at operation 1104, where the first and second largest coding units are encoded into a bitstream using the first, second, third, and fourth partitioning and coding mode selections. The bitstream may include any suitable data format and/or syntax. In some embodiments, the bitstream is a standards compliant bitstream such as an HEVC compliant bitstream. The bitstream may include the resultant partitioning and coding mode selections as well as coded residuals for the first and second largest coding units, for example.

Process 1100 may be repeated any number of times either in series or in parallel for any number of largest coding units or of a video frame, video frames, videos, pieces of video content. video segments, or the like.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 13:
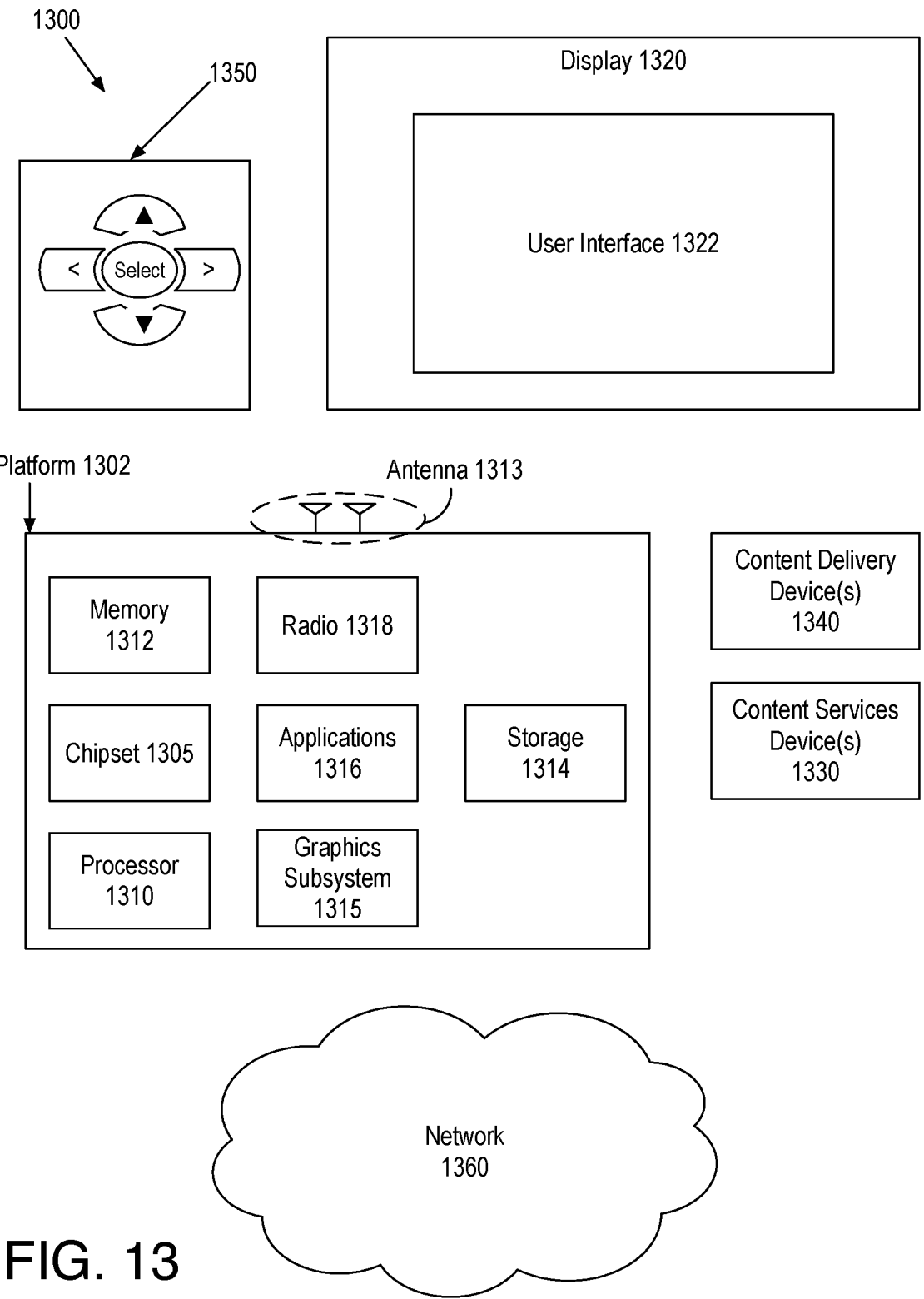
FIG. 13 is an illustrative diagram of an example system.

FIG. 13 is an illustrative diagram of an example system 1300, arranged in accordance with at least some implementations of the present disclosure. In various implementations, system 1300 may be a mobile system although system 1300 is not limited to this context. For example, system 1300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1300 includes a platform 1302 coupled to a display 1320. Platform 1302 may receive content from a content device such as content services device(s) 1330 or content delivery device(s) 1340 or other similar content sources. A navigation controller 1350 including one or more navigation features may be used to interact with, for example, platform 1302 and/or display 1320. Each of these components is described in greater detail below.

In various implementations, platform 1302 may include any combination of a chipset 1305, processor 1310, memory 1312, antenna 1313, storage 1314, graphics subsystem 1315, applications 1316 and/or radio 1318. Chipset 1305 may provide intercommunication among processor 1310, memory 1312, storage 1314, graphics subsystem 1315, applications 1316 and/or radio 1318. For example, chipset 1305 may include a storage adapter (not depicted) capable of providing intercommunication with storage 1314.

Processor 1310 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1310 may be dual-core processor(s), dual-core mobile processor(s), and so forth.

Memory 1312 may be implemented as a volatile memory device such as, but not limited to, a Random Access Memory (RAM), Dynamic Random Access Memory (DRAM), or Static RAM (SRAM).

Storage 1314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1314 may include technology to increase the storage performance enhanced protection for valuable digital media when multiple hard drives are included, for example.

Graphics subsystem 1315 may perform processing of images such as still or video for display. Graphics subsystem 1315 may be a graphics processing unit (GPU) or a visual processing unit (VPU), for example. An analog or digital interface may be used to communicatively couple graphics subsystem 1315 and display 1320. For example, the interface may be any of a High-Definition Multimedia Interface, DisplayPort, wireless HDMI, and/or wireless HD compliant techniques. Graphics subsystem 1315 may be integrated into processor 1310 or chipset 1305. In some implementations, graphics subsystem 1315 may be a stand-alone device communicatively coupled to chipset 1305.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1318 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1318 may operate in accordance with one or more applicable standards in any version.

In various implementations, display 1320 may include any television type monitor or display. Display 1320 may include, for example, a computer display screen, touch screen display, video monitor, television-like device, and/or a television. Display 1320 may be digital and/or analog. In various implementations, display 1320 may be a holographic display. Also, display 1320 may be a transparent surface that may receive a visual projection. Such projections may convey various forms of information, images, and/or objects. For example, such projections may be a visual overlay for a mobile augmented reality (MAR) application. Under the control of one or more software applications 1316, platform 1302 may display user interface 1322 on display 1320.

In various implementations, content services device(s) 1330 may be hosted by any national, international and/or independent service and thus accessible to platform 1302 via the Internet, for example. Content services device(s) 1330 may be coupled to platform 1302 and/or to display 1320. Platform 1302 and/or content services device(s) 1330 may be coupled to a network 1360 to communicate (e.g., send and/or receive) media information to and from network 1360. Content delivery device(s) 1340 also may be coupled to platform 1302 and/or to display 1320.

In various implementations, content services device(s) 1330 may include a cable television box, personal computer, network, telephone, Internet enabled devices or appliance capable of delivering digital information and/or content, and any other similar device capable of uni-directionally or bi-directionally communicating content between content providers and platform 1302 and/display 1320, via network 1360 or directly. It will be appreciated that the content may be communicated uni-directionally and/or bi-directionally to and from any one of the components in system 1300 and a content provider via network 1360. Examples of content may include any media information including, for example, video, music, medical and gaming information, and so forth.

Content services device(s) 1330 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1302 may receive control signals from navigation controller 1350 having one or more navigation features. The navigation features of may be used to interact with user interface 1322, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features may be replicated on a display (e.g., display 1320) by movements of a pointer, cursor, focus ring, or other visual indicators displayed on the display. For example, under the control of software applications 1316, the navigation features located on navigation may be mapped to virtual navigation features displayed on user interface 1322, for example. In various embodiments, may not be a separate component but may be integrated into platform 1302 and/or display 1320. The present disclosure, however, is not limited to the elements or in the context shown or described herein.

In various implementations, drivers (not shown) may include technology to enable users to instantly turn on and off platform 1302 like a television with the touch of a button after initial boot-up, when enabled, for example. Program logic may allow platform 1302 to stream content to media adaptors or other content services device(s) 1330 or content delivery device(s) 1340 even when the platform is turned "off." In addition, chipset 1305 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1300 may be integrated. For example, platform 1302 and content services device(s) 1330 may be integrated, or platform 1302 and content delivery device(s) 1340 may be integrated, or platform 1302, content services device(s) 1330, and content delivery device(s) 1340 may be integrated, for example. In various embodiments, platform 1302 and display 1320 may be an integrated unit. Display 1320 and content service device(s) 1330 may be integrated, or display 1320 and content delivery device(s) 1340 may be integrated, for example. These examples are not meant to limit the present disclosure.

In various embodiments, system 1300 may be implemented as a wireless system, a wired system, or a combination of both. When implemented as a wireless system, system 1300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 13.

Figure 14:
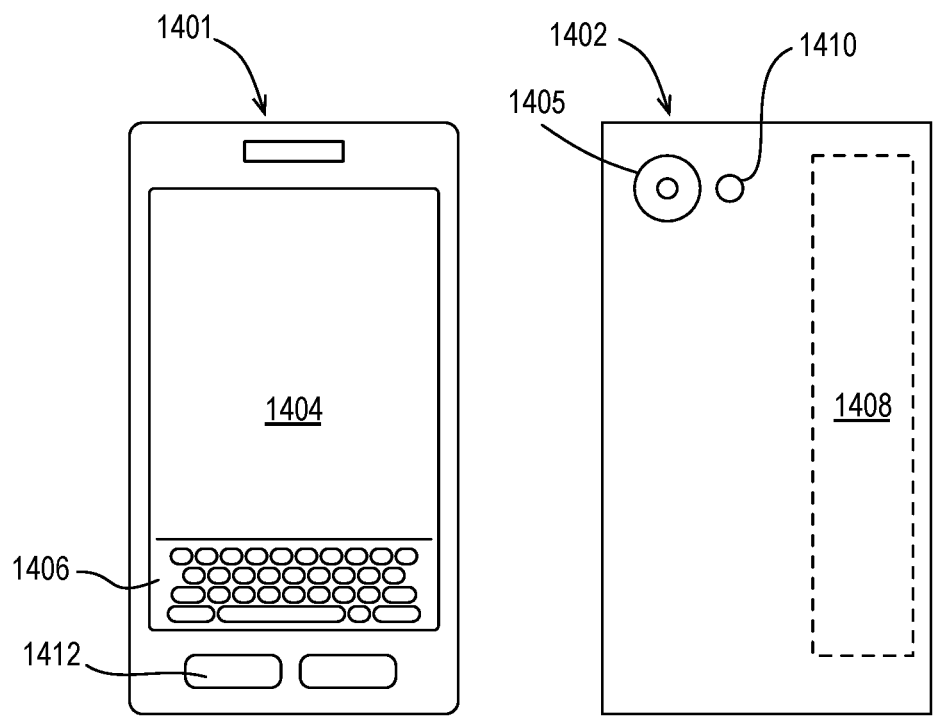
FIG. 14 illustrates an example device, all arranged in accordance with at least some implementations of the present disclosure.

As described above, system 1300 may be embodied in varying physical styles or form factors. FIG. 14 illustrates an example small form factor device 1400, arranged in accordance with at least some implementations of the present disclosure. In some examples, system 1300 may be implemented via device 1400. In other examples, system 100 or portions thereof may be implemented via device 1400. In various embodiments, for example, device 1400 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 14, device 1400 may include a housing with a front 1401 and a back 1402. Device 1400 includes a display 1404, an input/output (I/O) device 1406, and an integrated antenna 1408. Device 1400 also may include navigation features 1412. I/O device 1406 may include any suitable I/O device for entering information into a mobile computing device. Examples for I/O device 1406 may include an alphanumeric keyboard, a numeric keypad, a touch pad, input keys, buttons, switches, microphones, speakers, voice recognition device and software, and so forth. Information also may be entered into device 1400 by way of microphone (not shown), or may be digitized by a voice recognition device. As shown, device 1400 may include a camera 1405 (e.g., including a lens, an aperture, and an imaging sensor) and a flash 1410 integrated into back 1402 (or elsewhere) of device 1400. In other examples, camera 1405 and flash 1410 may be integrated into front 1401 of device 1400 or both front and back cameras may be provided. Camera 1405 and flash 1410 may be components of a camera module to originate image data processed into streaming video that is output to display 1404 and/or communicated remotely from device 1400 via antenna 1408 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for video coding comprises receiving first and second largest coding units of a video frame for partitioning and coding mode selection, wherein the second largest coding unit is horizontally aligned with and immediately to the right of the first largest coding unit and each of the first and second largest coding units comprises upper-left, upper-right, lower-left, and lower-right coding units, performing first partitioning and coding mode selections for the upper-left coding unit of the second largest coding unit and second partitioning and coding mode selections for the lower-right coding unit of the first largest coding unit in parallel, performing, immediately subsequent to the first and second partitioning and coding mode selections, third partitioning and coding mode selections for the upper-right coding unit of the second largest coding unit and fourth partitioning and coding mode selections for the lower-left coding unit of the second largest coding unit in parallel, and encoding the first and second largest coding units into a bitstream using the first, second, third, and fourth partitioning and coding mode selections.

In one or more second embodiments, further to the first embodiment, the method further comprises performing first integer motion estimation for the upper-left coding unit of the second largest coding unit and second integer motion estimation for the lower-right coding unit of the first largest coding unit in parallel and performing, immediately subsequent to the first and integer motion estimations, third integer motion estimation for the upper-right coding unit of the second largest coding unit and fourth integer motion estimation for the lower-left coding unit of the second largest coding unit in parallel, wherein the first, second, third, and fourth partitioning and coding mode selections are based on the first, second, third, and fourth integer motion estimations, respectively.

In one or more third embodiments, further to the first or second embodiments, performing the first integer motion estimation for the upper-left coding unit of the second largest coding unit uses a first resultant motion vector corresponding to the upper-right coding unit of the first largest coding unit as a motion vector merge candidate and disables usage of a motion vector merge candidate corresponding to the first largest coding unit.

In one or more fourth embodiments, further to any of the first through third embodiments, performing the fourth integer motion estimation for the lower-left coding unit of the second largest coding unit disables usage of a motion vector merge candidate corresponding to the upper-right coding unit of the second largest coding unit.

In one or more fifth embodiments, further to any of the first through fourth embodiments, the method further comprises determining whether the first partitioning and coding mode selections for the upper-left coding unit of the second largest coding unit comprises no partitioning and the third partitioning and coding mode selections for the upper-right coding unit of the second largest coding unit comprises no partitioning and performing a merge motion vector evaluation for the second largest coding unit in response to the first and third partitioning and coding mode selections comprising no partitionings or bypassing the merge motion vector evaluation for the second largest coding unit in response to either or both of the first and third partitioning and coding mode selections comprising additional partitionings.

In one or more sixth embodiments, further to any of the first through fifth embodiments, the method further comprises receiving a third largest coding unit of the video frame, wherein the third largest coding unit is horizontally aligned with and immediately to the right of the second largest coding unit and the third largest coding unit comprises upper-left, upper-right, lower-left, and lower-right coding units and performing, immediately subsequent to the third and fourth partitioning and coding mode selections, fifth partitioning and coding mode selections for the upper-left coding unit of the third largest coding unit and sixth partitioning and coding mode selections for the lower-right coding unit of the second largest coding unit in parallel, wherein performing or bypassing the merge motion vector evaluation for the second largest coding unit is in parallel with the fifth and sixth partitioning and coding mode selections.

In one or more seventh embodiments, further to any of the first through sixth embodiments, performing the first partitioning and coding mode selections for the upper-left coding unit of the second largest coding unit and the second partitioning and coding mode selections for the lower-right coding unit of the first largest coding unit in parallel comprises breaking a bottom-left coding dependency from the upper-left coding unit of the second largest coding unit to the lower-right coding unit of the first largest coding unit.

In one or more eighth embodiments, further to any of the first through seventh embodiments, performing the third partitioning and coding mode selections for the upper-right coding unit of the second largest coding unit and the fourth partitioning and coding mode selections for the lower-left coding unit of the second largest coding unit in parallel comprises breaking an upper-right coding dependency from the lower-left coding unit of the second largest coding unit to the upper-right coding unit of the second largest coding unit.

In one or more ninth embodiments, further to any of the first through eighth embodiments, the first coding unit is in a first largest coding unit wavefront and the second coding unit is in a second largest coding unit wavefront.

In one or more tenth embodiments, further to any of the first through ninth embodiments, the first partitioning and coding mode selections for the upper-left coding unit of the second largest coding unit are performed by a first execution unit of a processor and the second partitioning and coding mode selections for the lower-right coding unit of the first largest coding unit are performed by a second execution unit of the processor.

In one or more eleventh embodiments, further to any of the first through tenth embodiments, the first and second largest coding units are 64×64 pixels and each of the upper-left, upper-right, lower-left, and lower-right coding units are 32×32 pixels.

In one or more twelfth embodiments, a device or system includes a memory and a processor to perform a method according to any one of the above embodiments.

In one or more thirteenth embodiments, at least one machine readable medium includes a plurality of instructions that in response to being executed on a computing device, cause the computing device to perform a method according to any one of the above embodiments.

In one or more fourteenth embodiments, an apparatus includes means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A device for video coding comprising:
a memory to store at least a portion of a video frame, the video frame comprising a first largest coding unit (LCU) and a second LCU horizontally aligned with and immediately to the right of the first LCU, wherein each of the first and second LCUs comprises upper-left, upper-right, lower-left, and lower-right coding units (CUs); and
one or more processors coupled to the memory, the one or more processors to:
perform first integer motion estimation (IME) for the upper-left CU of the second LCU and second IME for the lower-right CU of the first LCU in parallel;
perform, immediately subsequent to the first and second IMEs, third IME for the upper-right CU of the second LCU and fourth IME for the lower-left CU of the second LCU in parallel, wherein the first IME for the upper-left CU of the second LCU uses a first resultant motion vector corresponding to the upper-right CU of the first LCU as a motion vector merge candidate and disables usage of a motion vector merge candidate corresponding to the first LCU;
perform first partitioning and coding mode selections for the upper-left CU of the second LCU and second partitioning and coding mode selections for the lower-right CU of the first LCU in parallel;
perform, immediately subsequent to the first and second partitioning and coding mode selections, third partitioning and coding mode selections for the upper-right CU of the second LCU and fourth partitioning and coding mode selections for the lower-left CU of the second LCU in parallel, wherein the first, second, third, and fourth partitioning and coding mode selections are based on the first, second, third, and fourth IMEs, respectively; and
encode the first and second LCUs into a bitstream using the first, second, third, and fourth partitioning and coding mode selections.

2. The device of claim 1, wherein the one or more processors to perform the fourth IME for the lower-left CU of the second LCU disables usage of a second motion vector merge candidate corresponding to the upper-right CU of the second LCU.

3. The device of claim 1, the one or more processors to:
determine whether the first partitioning and coding mode selections for the upper-left CU of the second LCU comprises no partitioning and the third partitioning and coding mode selections for the upper-right CU of the second LCU comprises no partitioning; and
perform a merge motion vector evaluation for the second LCU in response to the first and third partitioning and coding mode selections comprising no partitionings, or
bypass the merge motion vector evaluation for the second LCU in response to either or both of the first and third partitioning and coding mode selections comprising additional partitionings.

4. The device of claim 3, wherein the video frame comprises a third LCU horizontally aligned with and immediately to the right of the second LCU and wherein the third LCU comprises upper-left, upper-right, lower-left, and lower-right CUs, the one or more processors to:
perform, immediately subsequent to the third and fourth partitioning and coding mode selections, fifth partitioning and coding mode selections for the upper-left CU of the third LCU and sixth partitioning and coding mode selections for the lower-right CU of the second LCU in parallel, wherein the one or more processors to perform or bypass the merge motion vector evaluation for the second largest CU is in parallel with the fifth and sixth partitioning and coding mode selections.

5. The device of claim 1, wherein the one or more processors to perform the first partitioning and coding mode selections for the upper-left CU of the second LCU and the second partitioning and coding mode selections for the lower-right CU of the first LCU in parallel comprises breaking a bottom-left coding dependency from the upper-left CU of the second LCU to the lower-right CU of the LCU.

6. The device of claim 1, wherein the one or more processors to perform the third partitioning and coding mode selections for the upper-right CU of the second LCU and the fourth partitioning and coding mode selections for the lower-left CU of the second LCU in parallel comprises breaking an upper-right coding dependency from the lower-left CU of the second LCU to the upper-right CU of the second LCU.

7. The device of claim 1, wherein the first CU is in a first LCU wavefront and the second CU is in a second LCU wavefront.

8. The device of claim 1, wherein the first partitioning and coding mode selections for the upper-left CU of the second LCU are performed by a first execution unit of the one or more processors and the second partitioning and coding mode selections for the lower-right CU of the first LCU are performed by a second execution unit of the one or more processors.

9. The device of claim 1, wherein the first and second LCUs are 64×64 pixels and each of the upper-left, upper-right, lower-left, and lower-right coding units CUs are 32×32 pixels.

10. At least one non-transitory machine readable medium comprising a plurality of instructions that, in response to being executed on a computing device, cause the computing device to code video by:
receiving first and second largest coding units (LCUs) of a video frame, wherein the second LCU is horizontally aligned with and immediately to the right of the LCU and each of the first and second LCUs comprises upper-left, upper-right, lower-left, and lower-right coding units (CUs);
performing first integer motion estimation (IME) for the upper-left CU of the second LCU and second IME for the lower-right CU of the first LCU in parallel;
performing, immediately subsequent to the first and second IMEs, third IME for the upper-right CU of the second LCU and fourth IME for the lower-left CU of the second LCU in parallel, wherein the first IME for the upper-left CU of the second LCU uses a first resultant motion vector corresponding to the upper-right CU of the first LCU as a motion vector merge candidate and disables usage of a motion vector merge candidate corresponding to the first LCU;
performing first partitioning and coding mode selections for the upper-left CU of the second LCU and second partitioning and coding mode selections for the lower-right CU of the first LCU in parallel;
performing, immediately subsequent to the first and second partitioning and coding mode selections, third partitioning and coding mode selections for the upper-right CU of the second LCU and fourth partitioning and coding mode selections for the lower-left CU of the second LCU in parallel, wherein the first, second, third, and fourth partitioning and coding mode selections are based on the first, second, third, and fourth IMEs, respectively; and
encoding the first and second LCUs into a bitstream using the first, second, third, and fourth partitioning and coding mode selections.

11. The non-transitory machine readable medium of claim 10, wherein performing the fourth IME for the lower-left CU of the second LCU disables usage of a second motion vector merge candidate corresponding to the upper-right CU of the second LCU.

12. The non-transitory machine readable medium of claim 10, further comprising instructions that, in response to being executed on the computing device, cause the computing device to code video by:
determining whether the first partitioning and coding mode selections for the upper-left CU of the second LCU comprises no partitioning and the third partitioning and coding mode selections for the upper-right CU of the second LCU comprises no partitioning; and
performing a merge motion vector evaluation for the second LCU in response to the first and third partitioning and coding mode selections comprising no partitionings, or
bypassing the merge motion vector evaluation for the second LCU in response to either or both of the first and third partitioning and coding mode selections comprising additional partitionings.

13. The non-transitory machine readable medium of claim 10, wherein performing the first partitioning and coding mode selections for the upper-left CU of the second LCU and the second partitioning and coding mode selections for the lower-right CU of the first LCU in parallel comprises breaking a bottom-left coding dependency from the upper-left CU of the second LCU to the lower-right CU of the LCU or performing the third partitioning and coding mode selections for the upper-right CU of the second LCU and the fourth partitioning and coding mode selections for the lower-left CU of the second LCU in parallel comprises breaking an upper-right coding dependency from the lower-left CU of the second LCU to the upper-right CU of the second LCU.

14. A device for video coding, comprising:
a memory to store at least a portion of a video frame, the video frame comprising a first largest coding unit (LCU) and a second LCU horizontally aligned with and immediately to the right of the first LCU, wherein each of the first and second LCUs comprises upper-left, upper-right, lower-left, and lower-right coding units (CUs); and
one or more processors coupled to the memory, the one or more processors to:
perform first integer motion estimation (IME) for the upper-left CU of the second LCU and second IME for the lower-right CU of the first LCU in parallel;
perform, immediately subsequent to the first and second IMEs, third IME for the upper-right CU of the second LCU and fourth IME for the lower-left CU of the second LCU in parallel, wherein the first IME for the upper-left CU of the second LCU uses a first resultant motion vector corresponding to the upper-right CU of the first LCU as a motion vector merge candidate and disables usage of a motion vector merge candidate corresponding to the first LCU; and
encode the first and second LCUs into a bitstream based on the first, second, third, and fourth IMEs.

15. The device of claim 14, wherein the one or more processors to perform the fourth IME for the lower-left CU of the second LCU disables usage of a second motion vector merge candidate corresponding to the upper-right CU of the second LCU.

16. The device of claim 14, the processor further to:
perform first partitioning and coding mode selections for the upper-left CU of the second LCU and second partitioning and coding mode selections for the lower-right CU of the first LCU in parallel; and
perform third partitioning and coding mode selections for the upper-right CU of the second LCU and fourth partitioning and coding mode selections for the lower-left CU of the LCU in parallel.

17. The device of claim 16, the one or more processors to:
determine whether the first partitioning and coding mode selections for the upper-left CU of the second LCU comprises no partitioning and the third partitioning and coding mode selections for the upper-right CU of the second LCU comprises no partitioning; and
perform a merge motion vector evaluation for the second LCU in response to the first and third partitioning and coding mode selections comprising no partitionings, or bypass the merge motion vector evaluation for the second LCU in response to either or both of the first and third partitioning and coding mode selections comprising additional partitionings.

18. The device of claim 17, wherein the video frame comprises a third LCU horizontally aligned with and immediately to the right of the second LCU and wherein the third LCU comprises upper-left, upper-right, lower-left, and lower-right CUs, the one or more processors to:
perform, immediately subsequent to the third and fourth partitioning and coding mode selections, fifth partitioning and coding mode selections for the upper-left CU of the third LCU and sixth partitioning and coding mode selections for the lower-right CU of the second LCU in parallel, wherein the one or more processors to perform or bypass the merge motion vector evaluation for the second largest CU is in parallel with the fifth and sixth partitioning and coding mode selections.

19. The device of claim 16, wherein the one or more processors to perform the first partitioning and coding mode selections for the upper-left CU of the second LCU and the second partitioning and coding mode selections for the lower-right CU of the first LCU in parallel comprises breaking a bottom-left coding dependency from the upper-left CU of the second LCU to the lower-right CU of the LCU.

20. The device of claim 16, wherein the one or more processors to perform the third partitioning and coding mode selections for the upper-right CU of the second LCU and the fourth partitioning and coding mode selections for the lower-left CU of the second LCU in parallel comprises breaking an upper-right coding dependency from the lower-left CU of the second LCU to the upper-right CU of the second LCU.

* * * * *